(12) United States Patent
Golla et al.

(10) Patent No.: US 7,007,123 B2
(45) Date of Patent: Feb. 28, 2006

(54) BINARY TREE ARBITRATION SYSTEM AND METHOD USING EMBEDDED LOGIC STRUCTURE FOR CONTROLLING FLAG DIRECTION IN MULTI-LEVEL ARBITER NODE

(75) Inventors: Prasad N. Golla, Plano, TX (US); Gerard Damm, Dallas, TX (US); Timochin Ozugur, Garland, TX (US); John Blanton, Dallas, TX (US); Dominique Verchere, Plano, TX (US)

(73) Assignee: Alcatel, Paris (FR)

( * ) Notice: Subject to any disclaimer, the term of this patent is extended or adjusted under 35 U.S.C. 154(b) by 628 days.

(21) Appl. No.: 10/109,423

(22) Filed: Mar. 28, 2002

(65) Prior Publication Data

US 2003/0188065 A1 Oct. 2, 2003

(51) Int. Cl.
 *G06F 13/14* (2006.01)

(52) U.S. Cl. ............... 710/243; 710/111; 710/113; 710/120

(58) Field of Classification Search ......... 710/240–244, 710/111–113, 119–122, 309; 709/252
See application file for complete search history.

(56) References Cited

U.S. PATENT DOCUMENTS

| | | | | |
|---|---|---|---|---|
| 5,301,333 A | * | 4/1994 | Lee ............................. | 710/244 |
| 5,519,837 A | | 5/1996 | Tran ............................ | 395/291 |
| 5,870,629 A | * | 2/1999 | Borden et al. ................ | 710/44 |
| 6,032,218 A | * | 2/2000 | Lewin et al. ................ | 710/240 |
| 6,160,812 A | * | 12/2000 | Bauman et al. ............. | 370/416 |
| 6,420,901 B1 | * | 7/2002 | Liu et al. ...................... | 326/38 |
| 6,516,369 B1 | * | 2/2003 | Bredin ......................... | 710/111 |
| 6,757,246 B1 | * | 6/2004 | Alasti et al. ................ | 370/230 |

FOREIGN PATENT DOCUMENTS

EP 1137316 A2 * 9/2001

OTHER PUBLICATIONS

Journal of High Speed Networks 8; "A terabit IP switch router using optoelectronic technology"; H. Jonathan Chao, Xiaolei Guo, Cheuk–Hung Lam and Ti–Shiang Wang; pp. 35–57; 1999.

(Continued)

*Primary Examiner*—Paul R. Myers
*Assistant Examiner*—Raymond N Phan
(74) *Attorney, Agent, or Firm*—Danamraj & Youst, P.C.; Jessica W. Smith; V. Lawrence Sewell

(57) ABSTRACT

A binary-tree-based arbitration system and methodology with attributes that approximate a Generalized Processor Sharing (GPS) scheme for rendering fairer service grants in an environment having a plurality of competing entities. Arbitration based on probabilistic control of arbiter nodes' behavior is set forth for alleviating the inherent unfairness of a binary tree arbiter (BTA). In one implementation, BTA flag direction probabilities are computed based on composite weighted functions that assign relative weights or priorities to such factors as queue sizes, queue ages, and service class parameters. Within this general framework, techniques for desynchronizing a binary tree's root node, shuffling techniques for mapping incoming service requests to the BTA's inputs, and multi-level embedded trees are described.

33 Claims, 24 Drawing Sheets

OTHER PUBLICATIONS

Scalable High–Speed Switches/Routers with QoS Support; "Saturn: A Terabit Packet Switch Using Dual Round–Robin"; Jonathan Chao, Polytechnic University; pp. 78–84; Dec. 2000.

"A Binary–Tree Architecture for Scheduling Real–Time Systems with Hard and Soft Tasks"; A. Garcia, S. Saez, J. Vila and A. Craspo; Integrated Circuits and Systems Design; pp. 78–81; 1999.

"Scalable Hardware Priority Queue Architectures for High–Speed Packet Switches"; Sung–Whan Moon, J. Rexford and K.G. Shin; Computers, IEEE Transaction on vol. 49, Issue 11; pp. 1215–1227; Nov. 2002.

"A Fast Arbitration Scheme for Terabit Packet Switches"; H.J. Chao, C.H. Lam and X. Guo; Global Telecommunications Conference, GLOBECOM 99, vol. 2; pp. 1236–1243; 1999.

"Quality of Service in the Internet: Fact, Fiction, or Compromise?"; Paul Ferguson and Geoff Huston; pp. 1–20; Jul. 1998.

* cited by examiner

REQUEST OF INGRESS
P5 GRANTED

FIG. 3F

| p-BTA input | QoS priority $C_i$ | Size $S_i$ | Age $A_i$ | Normalized $S_i$ | Normalized $A_i$ |
|---|---|---|---|---|---|
| P1 | 3 | 5 | 9 | 5/10=0.5 | 9/40=0.225 |
| P2 | 1 | 2 | 5 | 0.2 | 0.125 |
| P3 | 3 | 1 | 2 | 0.1 | 0.050 |
| P4 | 1 | 2 | 8 | 0.2 | 0.200 |

FIG. 3G

| Arbiter | f() | g() | p |
|---|---|---|---|
| A | 0.750 | 0.690 | 0.720 |
| B | 0.750 | 0.273 | 0.511 |

FIG. 3H

| C input | QoS priority $C_i$ | Size $S_i$ | Age $A_i$ | Normalized $S_i$ | Normalized $A_i$ |
|---|---|---|---|---|---|
| i | (3+1)/2=2 | (5+2)/2=3.5 | (9+5)/2=7 | 3.5/10=0.35 | 7/40=0.175 |
| j | 2 | 1.5 | 5 | 0.15 | 0.125 |

FIG. 3I

| Arbiter | f() | g() | p |
|---|---|---|---|
| C | 0.500 | 0.656 | 0.578 |

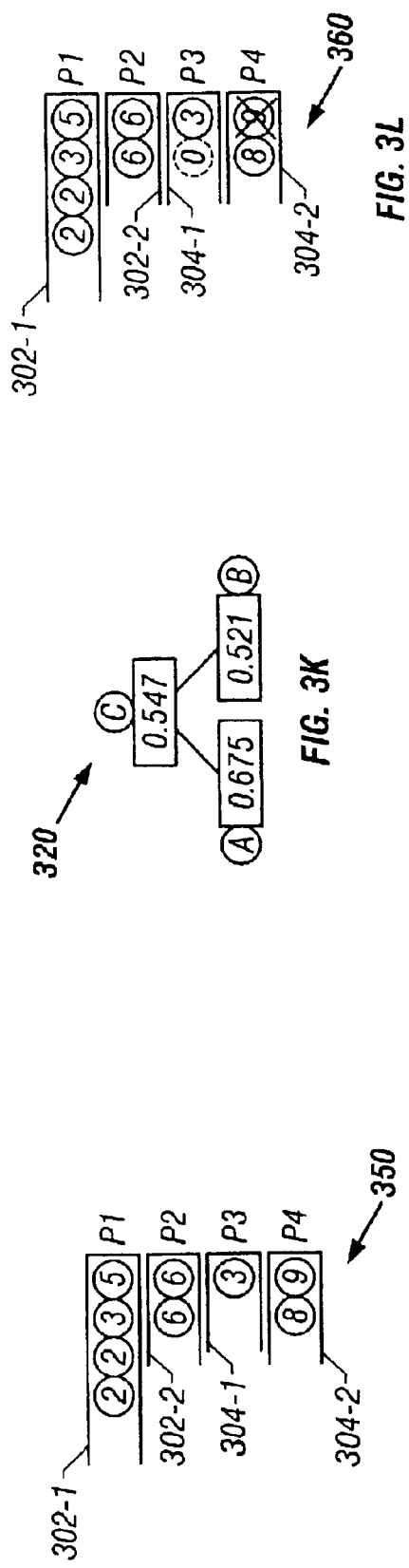

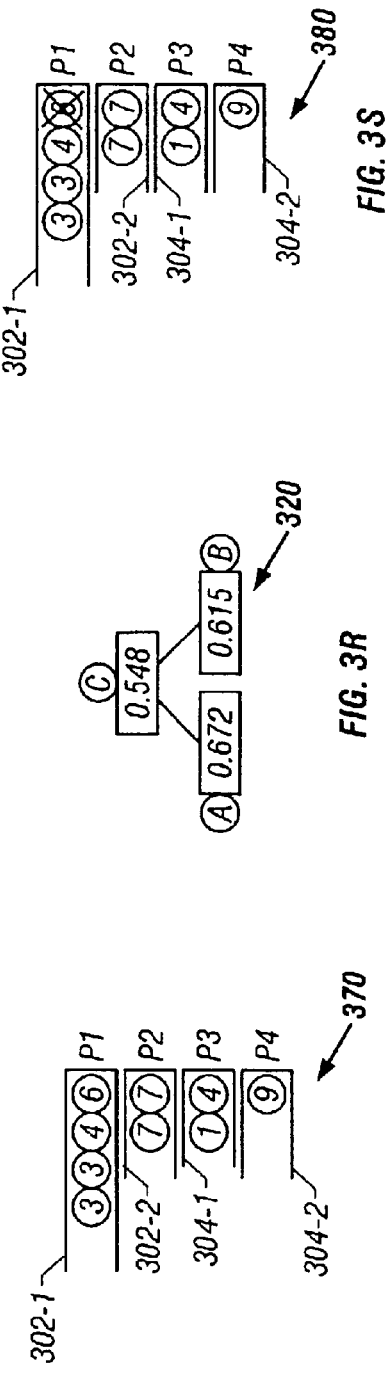

BINARY TREE ARBITRATION SYSTEM AND METHOD USING EMBEDDED LOGIC STRUCTURE FOR CONTROLLING FLAG DIRECTION IN MULTI-LEVEL ARBITER NODE

CROSS-REFERENCE TO RELATED APPLICATION(S)

This application discloses subject matter related to the subject matter disclosed in the following commonly owned co-pending patent application(s): (i) "Multiserver Scheduling System And Method For A Fast Switching Element," application Ser. No. 10/059,641, filed Jan. 28, 2002, in the names of: Prasad Golla, Gerard Damm, John Blanton, Mei Yang, Dominique Verchere, Hakki Candan Cankaya, and Yijun Xiong and (ii) "Look-Up Table Arbitration System And Method For A Fast Switching Element," application Ser. No.: 10/075,176, filed Feb. 14, 2002, in the names of: Prasad Golla, Gerard Damm, John Blanton, and Dominique Verchere, which is (are) hereby incorporated by reference for all purposes.

BACKGROUND OF THE INVENTION

1. Technical Field of the Invention

The present invention generally relates to arbitration techniques. More particularly, and not by way of any limitation, the present invention is directed to a binary tree arbitration (BTA) system and method designed to provide fairer servicing.

2. Description of Related Art

The use of arbitration is well-known as a resolution mechanism among a plurality of units contending for a common resource. For example, servers associated with input and output ports of a network element must first compete in order to establish appropriate traffic paths across a switching fabric before data can be transported between a selected input port and an output port. Since arbitration times can take a significant portion of a scheduling process, it is highly desirable to implement a faster arbitration scheme where massive throughput rates are required.

Other concerns also arise in environments involving a selection of one among several weighted units. Ideally, any arbitration technique employed in such a scenario should result in a selection probability distribution that matches the units' relative weights in accordance with established Generalized Processor Sharing (GPS) principles. When applied to scheduling processes in a network element, this problem translates into arbitrating among requests generated by various input queues that are differentiated based on a number of Quality of Service (QoS) parameters.

Known solutions for supporting fast arbitrations (i.e., where arbitration iterations can be executed in a few clock cycles) involve arbiters whose structure and logic are implemented in hardware. Such hardware implementations of round-robin arbiters (RRAs) and binary tree arbiters (BTAs) are exemplary. Whereas these solutions are deemed to be generally adequate in terms of their scalability and relatively simpler design, certain deficiencies and shortcomings persist. First, although the existing hardware-based RRAs and BTAs are fast, they are not fair with respect to servicing requests from differentiated traffic classes. Typically, fairness can only be implemented at the cost of computational complexity, which not only necessitates expensive hardware but results in slower arbitration times as well. Thus, the price/performance ratios of today's arbiters are not entirely satisfactory in QoS-aware networks.

Further, the current RRA and BTA techniques are inherently unfair in the case of polarized traffic where a portion of the contending units disproportionately generate service requests relative to the other units. In the context of telecommunications networks, this condition introduces longer access delays and queue lengths, in addition to packet loss due to full buffers. Relatedly, where the traffic is classified into multiple priorities, low priority queues may have to contend with buffer starvation which results in degraded service.

SUMMARY OF THE INVENTION

Accordingly, the present invention advantageously provides an innovative, tree-based arbitration system and methodology with attributes that approximate a GPS scheme for rendering fairer service grants in an environment having a plurality of competing entities. Arbitration based on probabilistic control of arbiter nodes' behavior is set forth for alleviating the inherent unfairness of a binary tree. In one implementation, BTA flag direction probabilities are computed based on composite weighted functions that assign relative weights or priorities to such factors as queue sizes, queue ages, and service class parameters. Within this general framework, techniques for desynchronizing a binary tree's root node, shuffling techniques for variously mapping incoming service requests to a BTA's inputs, and multi-level embedded trees are described.

In one aspect, the present invention is directed to a system for arbitrating among N competing entities, e.g., ingress and egress ports of a network element, each entity operating to generate a service request. The system is comprised of a tree structure having (N−1) arbiter nodes organized into K levels, where $N=2^K$ and the levels are designated Level-1 through Level-K. Each Level-1 arbiter node is preferably operable to select between two competing service requests. At least one arbiter node at a higher level, designated as a Level-i node (where $i=2 \rightarrow K$), is operable to select between two competing outputs generated by two lower level arbiter nodes (designated as Level-(i-1) nodes) coupled thereto. For convenience and concision, the competing service requests and the competing outputs may collectively be referred to as competing links for purposes of the present invention.

Each arbiter node has a direction indicator (e.g., a flag) associated therewith, which is operable to indicate a particular link that each arbiter node will favor out of a pair of competing links coupled thereto. A logic structure is provided for determining a probability value associated with the direction indicator based on a set of predetermined factors relating to the pair of competing links.

Preferably, the direction indicators are resettable upon each arbitration cycle with updated probability values. Further, the probability values are computed based on a composite weighted function having relative weights with respect to such variables as queue sizes, queue ages and service class parametrics that relate to the competing links coupled to an arbiter node. For each link coupled to a Level-i node (i.e., an intermediary node or the root node of the tree structure), the parameters are derived based on a mathematical formulation that "averages" the parametric values over the entire sub-tree that supports the link. It should be understood that the mathematical formulations can take form of any known or heretofore unknown linear or non-linear relationships.

In another aspect, the present invention is directed to a multi-level system for arbitrating among N competing entities. The system may be comprised of a primary tree structure having (N−1) arbiter nodes such as the tree structure set forth above. Also, each arbiter node is provided with a flag for indicating a particular link that the arbiter node will pick out of a pair of competing links depending upon the flag's direction. An embedded logic structure, which could be another arbiter, e.g., a BTA (referred to a secondary BTA) is provided for controlling the flag direction of at least one arbiter node after each arbitration cycle. Further, the arbiter nodes of the secondary BTA themselves be embedded with yet another level of BTA(s) for controlling their flags. In one exemplary embodiment, the embedded BTAs may be implemented as prioritized BTAs, each having a different priority level.

In a further aspect, the present invention is directed to what may be referred to as a "Double BTA" system for arbitrating among N competing entities. Essentially, two parallel BTAs are provided, each being similar to the BTA implementations set forth above. Whereas one BTA receives the incoming requests in one order of sequence with respect to its input mapping, the other BTA receives the requests in a different order by virtue of a permutation or combination of the incoming requests. Each BTA executes in parallel and generates an output, which is then provided to a top node arbiter (i.e., a supra-BTA node) that arbitrates between these two outputs in order to select one arbitration winner.

In yet another aspect, the present invention is directed to an arbitration system where the root node of a BTA is modified such that its selection mechanism between the two competing links coupled thereto is modulated based on relative weights accorded to the left and right sub-trees supporting the links. A logic structure is provided for determining a first weight factor associated with the left sub-tree and a second weight factor associated with the right sub-tree. In one implementation, the weight factors can be the number of active requests available to the Level-1 nodes in the respective sub-trees. The weight factors preferably operate to control the root node's flag direction after each arbitration cycle.

In a still further aspect, the present invention is directed to an arbitration system where the incoming requests are shuffled so that the effects of polarized traffic are advantageously mitigated. In one exemplary embodiment, the present invention provides a system for arbitrating among N competing entities, each entity operating to generate a service request. The system is comprised of a plurality of binary tree arbiter (BTA) structures, each being executable in parallel. A shuffler mechanism is included for shuffling N service requests into a plurality of combinations, each combination being mapped to N inputs of a corresponding BTA structure. Thus, each BTA structure is operable to select one of the service requests as an output based on the combination of requests mapped to its inputs. A logic structure (e.g., a separate round robin arbiter) is provided that is operable responsive to the multiple BTA outputs in order to select a particular output as the arbitration winner.

In another exemplary embodiment wherein the incoming requests are shuffled, the present invention also provides for a full shuffle mapping of the arbiter inputs with respect to a single BTA structure having (N–1) arbiter nodes. A logic structure is provided for staging the incoming requests into a plurality of shuffle stages, wherein each stage operates to map the BTA inputs to a unique combination of the requests. The logic structure is also operable to specify the stage that the BTA will use for any particular arbitration cycle. Preferably, the stages are sequentially selected in a cyclical order.

In yet another aspect, the present invention is directed to an arbitration system wherein the incoming requests are virtually shuffled with respect to a BTA's input vector, which may be referred to as a virtual input branch. The incoming requests are provided in a real request port branch having a left half portion and a right half portion. Similarly, the BTA's virtual input branch is partitioned with a left half portion and a right half portion. At least one shuffle interface is included that is operable to effectuate, when necessary, the mapping of an actual request from one portion to the other portion of the virtual input branch. That is, an actual request from the right half portion is mapped to a location in the left half portion of the virtual input branch, and vice versa. Thus, one or more separate right shuffle interfaces may be provided for mapping actual request(s) from the left half portion of the real request port branch to the right half portion of the virtual input branch. Analogously, one or more separate left shuffle interfaces may be provided for mapping actual request(s) from the right half portion of the real request port branch to the left half portion of the virtual input branch. A shuffle controller is provided for controlling the shuffle interface(s) which can be selected based on a suitable shuffle pointer mechanism (e.g., a round robin arbiter).

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1A:
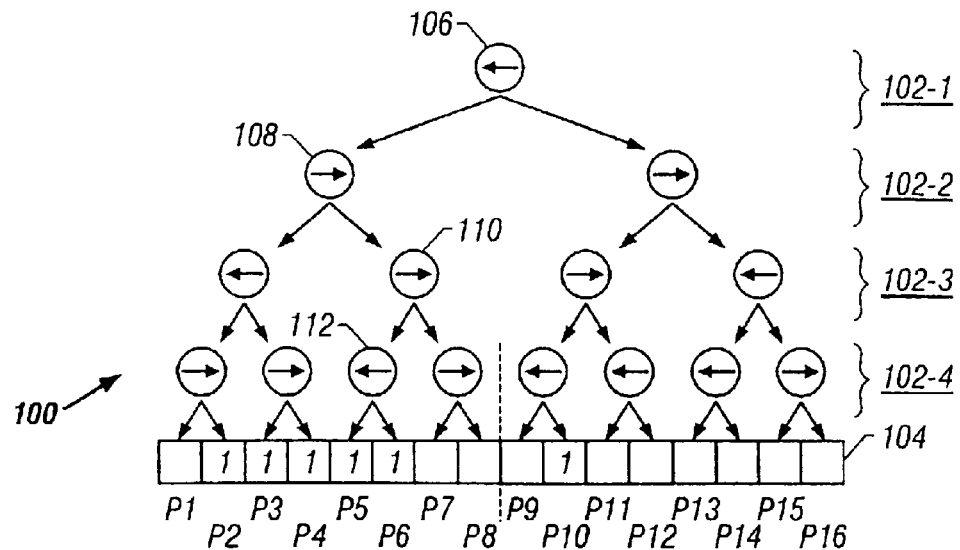
FIGS. 1A and 1B (Prior Art) depict an exemplary BTA with four levels for arbitrating among 16 input requests in a conventional deterministic operation.
Figure 1B:
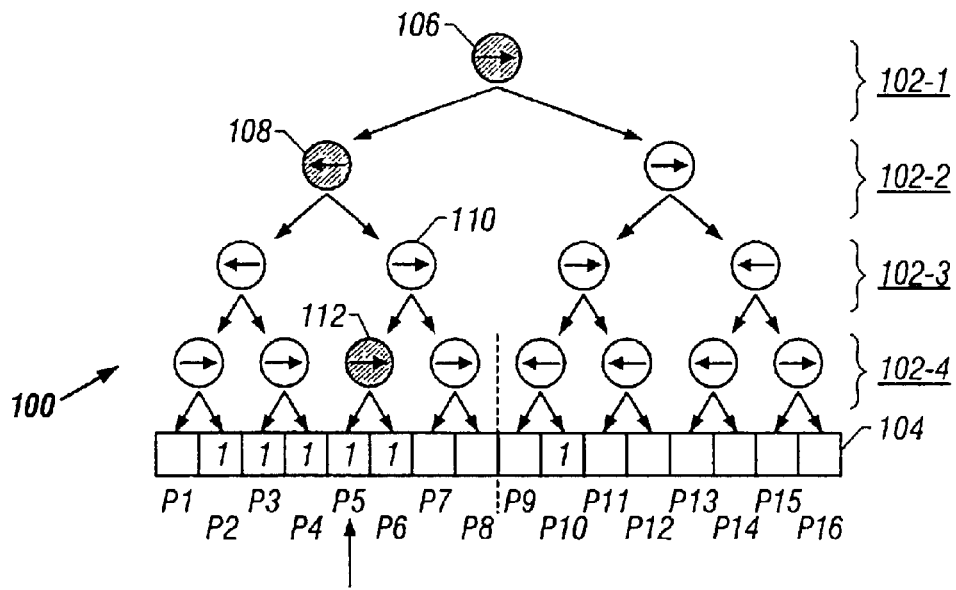

In the drawings, like or similar elements are designated with identical reference numerals throughout the several views thereof, and the various elements depicted are not necessarily drawn to scale. Referring now to FIGS. 1A and 1B, depicted therein is an exemplary BTA 100 with four levels for arbitrating among 16 input requests in a conventional deterministic operation. P1 through P16 refer to the 16 competing entities requesting service. In one exemplary embodiment, the competing entities may represent ingress ports and associated queues, egress ports and associated queues, et cetera, prevalent in a network element such as the elements described in the cross-referenced patent applications cited hereinabove.

As is well-known, the BTA is a data structure associated with a selection mechanism, and is arranged such that the tree nodes are binary (i.e., only two "children" per node). Each tree node is an arbiter that is responsible for selecting between two entities. For N competing entities, the binary tree will have K levels, wherein $K=\log_2 [N]$. In the exemplary BTA depicted in FIGS. 1A and 1B, where N=16, four levels of binary arbiter nodes are arranged in a tree, wherein reference numeral 102-4 refers to Level-1 having a number of the leaf arbiter nodes (Level-1 nodes), reference numeral 102-3 refers to Level-2 having a number of intermediate arbiter nodes (Level-2 nodes), reference numeral 102-2 refers to Level-3 having another set of intermediate arbiter nodes (Level-3 nodes), and reference numeral 102-1 refers to Level-4 having a single root arbiter node 106.

Conventionally, each tree arbiter node (designated as an AR2 node) is provided with a Boolean flag (which can illustrated as an arrow pointing in the left or right direction) that operates to select one of the two children connected thereto. The leaves of the tree are connected to an input vector of 0's and 1's representing the presence of service requests, i.e., input vector 104, from various contending units (e.g., the ingress and egress ports of a communications network switch). The selection mechanism which allows to select one of the two requests from each group (i.e., group size=2), is comprised of two phases: an upward propagation phase of requests and a downward propagation phase of grants. In the upward propagation phase, each parent node (starting from the lowest level) will pick one of its children according to its flag and propagate a request to its parent on the next higher level. If both children have requests, the arbiter node selects the one its flag points to. If only one child has a request, the arbiter node selects it irrespective of its flag. Further, if there are no requests to an arbiter node from its children, it propagates no requests to its own parent (i.e., the arbiter node above it to which it is coupled).

The propagation of the requests continues until the final selection is made by the root node arbiter, whose choice is the start of the downward propagation. A node that was picked will update its flag such that the flag will point to the child other than the one it picked itself during the upward propagation. If the flag did not pick the child then the flag is not modified. At the end, only one leaf is selected, which selection is appropriately ANDed along the selection path. Additional details concerning the conventional operation of BTAs may be found in the commonly owned co-pending patent applications cross-referenced hereinabove.

As shown in the example of FIGS. 1A and 1B, P1 through P16 refer to 16 competing entities wherein P2–P6 and P10 entities have service requests. The selection path resulting in the selection of service request of P5 (i.e., service grant) by the BTA 100 can be summarized as follows. Leaf arbiter node 112 arbitrates between the requests of P5 and P6 and selects P5 because its flag points to the left. Regardless of its flag direction, node 110 selects the output of node 112 upon upward propagation because it is the only one upward request. Node 108 arbitrates between the output of node 110 and the output of the other AR2 child (which has selected P2), and selects P5 because of its flag. Finally, the root node 106 arbitrates between P5 and P10, and also selects P5 because of its flag. Upon the downward propagation of grants, P5 is ultimately picked. Accordingly, the flag directions of the nodes 106, 108 and 112 are reversed for the next arbitration cycle because they actually selected the P5 service request. The flag direction of node 110 is not reversed, however, because the flag did not actually participate in the selection of P5. The reversed flag condition of the participating nodes 106, 108 and 112 is highlighted in FIG. 1B.

It can be seen that in the conventional BTA operation, the direction a nodal flag is flipped or reversed based on the following two conditions: (1) the node participates in the selection of an input (i.e., it is in the selection path from the root node to the leaf node); and (2) the node actually arbitrates between its two children, each having an active input. Consequently, the resulting service selection algorithm may be considered to employ what can be referred to as "1-persistent" AR2 arbiters, since the flags of the nodes in the selection path that actually arbitrated are deterministically flipped (i.e., with a probability of 1) for the following arbitration cycle.

As pointed out in the Background section of the present patent application, the conventional BTA implementations can be promising due to their cost-effective design, scalability, and hardware-based realization for fast arbitration times. However, in a differentiated service request environment (e.g., QoS-aware traffic routing in a communications node), the deterministic nature of flag directionality from one arbitration cycle to the next may give rise to certain deficiencies such as buffer starvation in lower-priority service queues (i.e., "unfair queuing").

In accordance with the teachings of the present invention, a probabilistic approach to setting the nodal flags in a BTA is presented in order to service the queues more fairly. As will be seen below, the probabilistic methodology of the present invention is robust and broad enough that various aspects affecting service levels (e.g., QoS class, queue size, age, et cetera) can be advantageously factored in for systematically avoiding unfair service grant conditions. FIGS. 2A–2D depict a generalized scheme for implementing a QoS-based probabilistic BTA according to one embodiment. The following steps performed in a suitable controller logic mechanism capture the essential aspects:

For each arbitration cycle, requests and service differentiators are received by the BTA system comprising a plurality of AR2 arbiter nodes.

AR2 arbiters which have two requesting inputs will calculate their respective probabilities of picking one of the two inputs, and compute the direction of the flag. Probability P is associated with picking one input (e.g., the left input) and (1−P) is the probability of picking the other input (i.e., the right input).

Nodes that have only one input request do not need to compute any flag direction since they will choose that input request regardless of the flag. As seen before, there will be (N−1) AR2 nodes for N competing entities and, therefore, utmost (N−1) flag computations will be performed in each arbitration cycle.

An AR2 node with two inputs will pick one of its inputs with a probability of P and the other input with a probability of (1−P).

The probability P can be different at each AR2 node and for each arbitration cycle.

In accordance with the foregoing discussion, the resulting service arbitration scheme may be considered to employ what can be referred to as "P-persistent" AR2 arbiters, since the flags of the nodes in the selection path that actually arbitrated are flipped with a probability of P for each cycle. Significantly, the arbitration scheme is QoS-aware and queue-aware. Further, it should be appreciated that although the probabilistic scheme set forth herein is particularly exemplified in the context of a BTA (i.e., each node receiving a group of two competing inputs), the teachings of the present invention are applicable, mutatis mutandis, to any tree arbitration scheme where each of the nodes receives a group of M competing inputs (i.e., an m-ary tree arbiter). Additionally, whereas the controller logic can be implemented in hardware (e.g., field-programmable gate arrays or FPGAs, application-specific integrated circuits or ASICs, and the like), such logic may also be provided via appropriate software modules.

Figure 2A:
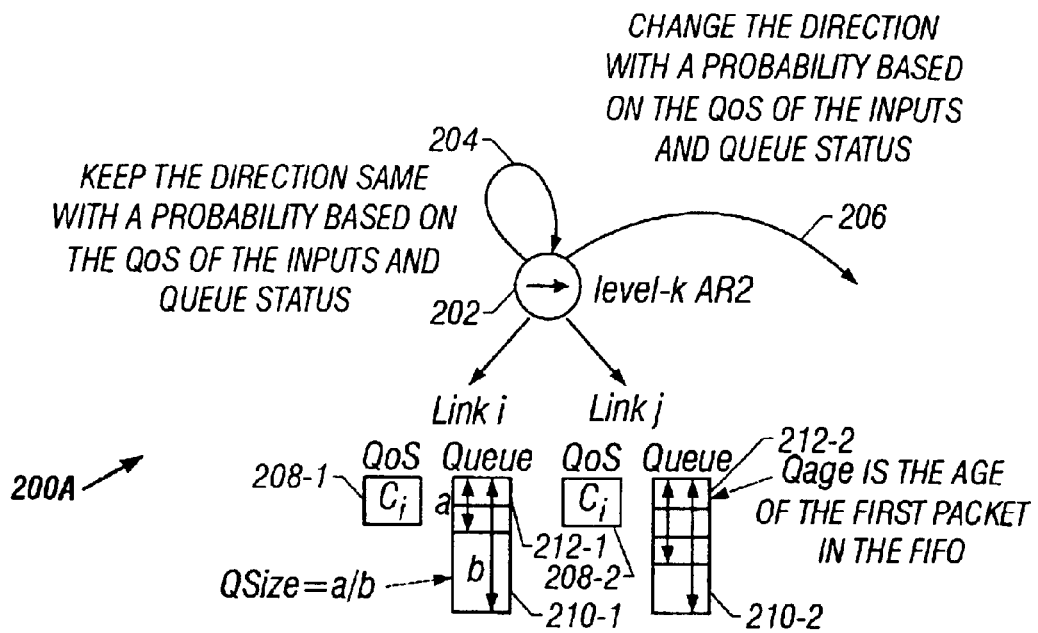
FIGS. 2A–2D depict an exemplary scheme for implementing a QoS-based probabilistic approach to the conventional BTA mechanism in accordance with the teachings of the present invention.

Specifically referring now to FIG. 2A, a heuristic decision model 200A shown therein illustrates the decision-making process executed by an appropriate controller logic structure with respect to the direction of an AR2 node 202 based on selected QoS parameters. To concretize the discussion, let us assume that the current arbitration cycle is the nth cycle and the probability P is required to be calculated for the $(n+1)^{th}$ cycle. The direction of the AR2 node 202 can be one of the following: (i) keep the direction same with a probability based on the QoS factors and queue status of the competing inputs (link i and link j), or (ii) change the direction with a probability based on the QoS factors and queue status of the inputs. Reference numerals 204 and 206 refer to these two decisions, respectively. Reference numerals 208-1 and 208-2 refer to the QoS classes associated with link i ($C_i$) and link j ($C_j$), respectively. Similarly, normalized queue size for links (Qsize=a/b, where a=actual depth of queue and b=maximum queue depth allowed) and queue age (Qage= the age of the first packet in the queue) associated therewith are defined. Reference numerals 210-1 and 212-2 and reference numerals 210-2 and 212-2 refer to these parameters for links i and j, respectively.

Figure 2B:
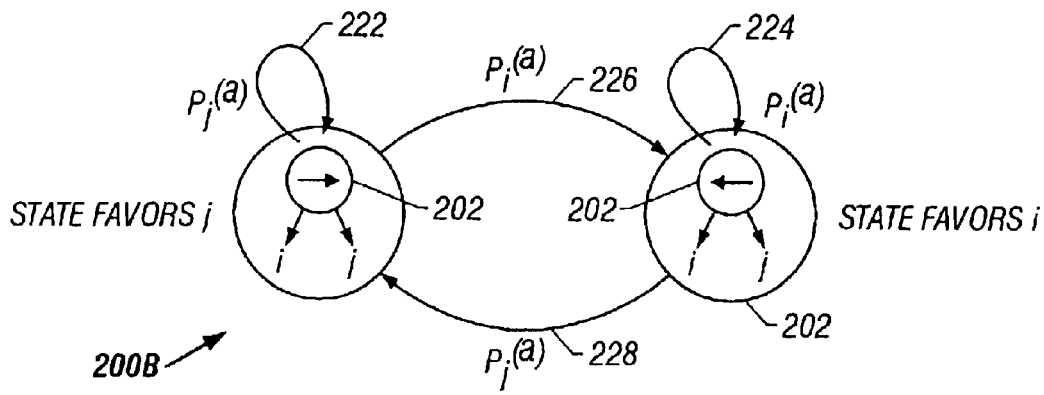

FIG. 2B depicts a state machine 200B for favoring one of the links by the AR2 202 based on the aforesaid parameters. The resulting states can be summarized as below:

Whichever state AR2 202 resides in the previous cycle, it will favor link i in the current cycle with a probability of $P_i$. Reference numerals 224 and 226 refer to the two probabilistic paths associated with favoring link i.

Whichever state AR2 202 resides in the previous cycle, it will favor link j in the current cycle with a probability of $P_j$. Reference numerals 222 and 228 refer to the two probabilistic paths associated with favoring link j.

Clearly, for any AR2 node, $P_i+P_j=1$. The probability $P_i$ associated with a particular AR2 can in general be defined as a composite weighted function that modulates the relative impact of various QoS parameters defined for each competing link. In the P-persistent BTA design of the present invention, all the node flags are reset before each arbitration cycle, independently from the previous selections. The new set of input requests and their associated weights are used to compute direction probabilities (i.e., P and (1−P)) for each flag. In one exemplary embodiment, the following steps are implemented for determining flag directions:

a random number (r) is generated for each flag;

r is compared to the direction probability, P; and set flag to the left direction if r<P; otherwise, set flag to the right direction.

Whereas a number of composite weighted functions can be defined for computing P by means of any known or heretofore unknown mathematical formulations, the following sets forth an empirical relationship that has been tested to yield satisfactory results by way of simulation:

$$P=F_1+F_2$$

where, $F_1$=First Weighted Function relating to the effect of QoS class level and $F_2$=Second Weighted Function relating to the queue size and age effects, which functions are:

$$F_1=\gamma *f(<C_i>,<C_j>); \text{ and}$$

$$F_2=(1-\gamma)*g(<Qsize_i>,<Qsize_j>,<Qage_i>,<Qage_j>)$$

The weight factor γ is provided for balancing the effects of QoS classes and the queue parametrics, and follows the relationship: $0 \leq \gamma \leq 1$. Functions $F_1$ and $F_2$ define the relative weight within QoS classes and within the queue parametrics, respectively, where $0 \leq f(X) \leq 1$ and $0 \leq g(X) \leq 1$.

In the definition of f(X) and g(X) functions set forth above, averaging functions for the QoS and queue parametrics (i.e., <C>, <Qage> and <Qsize>) have been applied for each competing link. Generically representing these parametrics as variable X, the operation of <X> with respect to a node represents the average value of the variable X thereat based on the leaves of the sub-tree supported under the node. The level of arbitration (i.e., Level-1 through Level-K for N competing requests, with $K=\log_2 N$) gives the number of leaves for each competing link of that particular node.

Figure 2C:
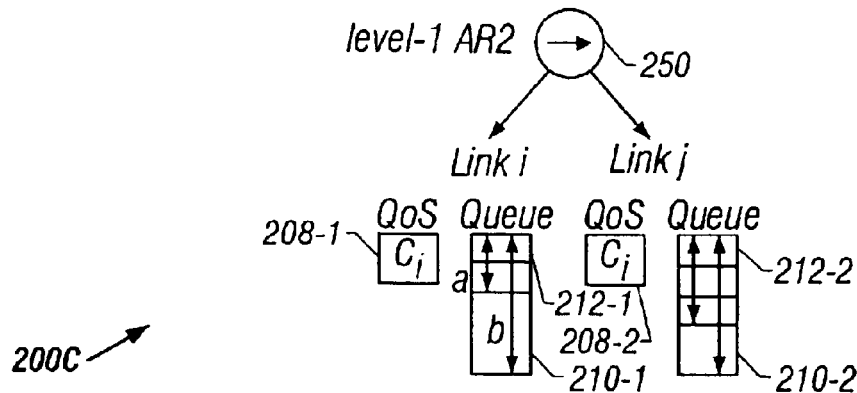
Figure 2D:
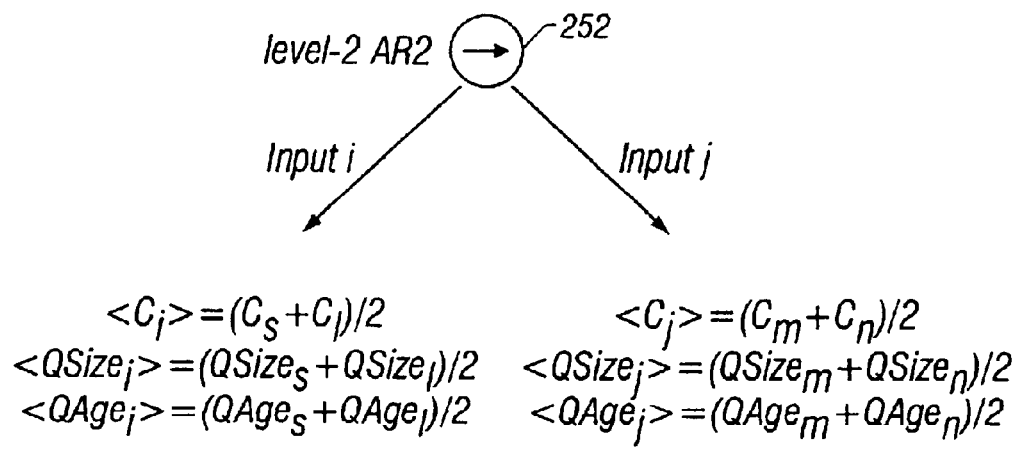
Figure 2D:
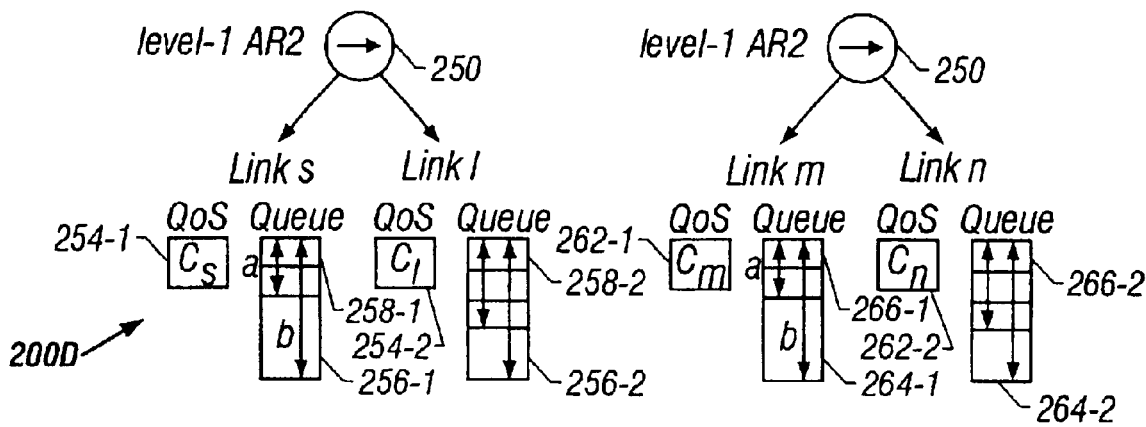

FIG. 2C illustrates a scheme 200C for defining the averaging function for a Level-1 AR2 node 250 having links i and j. FIG. 2D illustrates a scheme 200D for defining the averaging function for a Level-2 AR2 252 having two children, i.e., Level-1 AR2 nodes 250. With respect to the Level-1 AR2 node 250, links i and j represent the two leaves, each corresponding to an entity requesting service. As alluded to hereinbefore, the service requesting entities may represent two contending ports i and j in the context of a network switch element. Therefore, the QoS class parameter C and queue parameters Qsize and Qage represent the exact values for the ports i and j.

With respect to the Level-2 AR2 node 252, input i and input j each represents the upward request generated by the node's children, i.e., Level-1 nodes 250. As pointed out in the foregoing discussion, each Level-1 node arbitrates between two competing requests or links. Accordingly, input i represents links s and l and input j represents links m and n. For purposes of the teachings herein, inputs i and j, which are representations of the upward requests forwarded by the Level-1 nodes, can be treated as "competing outputs" of the lower level nodes (i.e., Level-1 nodes or Level-(i-1) nodes). Therefore, the average values of the QoS and queue parameters of the related ingress ports need to be taken for each link at a higher level. In other words, the parameters C, Qsize and Qage for input link i are calculated by averaging the combined C, Qsize and Qage values of links s and l as shown below:

$$\langle C_i \rangle = (C_s + C_t)/2$$

$$\langle Qsize_i \rangle = (Qsize_s + Qsize_t)/2$$

$$\langle Qage_i \rangle = (Qage_s + Qage_t)/2$$

Similarly, the parameters C, Qsize and Qage for input link j are calculated as below:

$$\langle C_j \rangle = (C_m + C_n)/2$$

$$\langle Qsize_j \rangle = (Qsize_m + Qsize_n)/2$$

$$\langle Qage_j \rangle = (Qage_m + Qage_n)/2$$

Reference numerals 254-1, 256-1 and 258-1 refer to the C, Qsize and Qage parametrics associated with input s. Likewise, reference numerals 254-2, 256-2 and 258-2 refer to the C, Qsize and Qage parametrics associated with input 1, reference numerals 262-1, 264-1 and 266-1 refer to the C, Qsize and Qage parametrics associated with input m and reference numerals 262-2, 264-2 and 266-2 refer to the C, Qsize and Qage parametrics associated with input n.

Where a Level-2 AR2 node is involved, each of link i and link j represents four competing inputs. In general, for a Level-K AR2 node, each of the links represents $2^{(K-1)}$ inputs. It should be appreciated that whereas a simple linear averaging is exemplified hereinabove, other, more complicated relationships may provided for each of the links i and j at the $K^{th}$ arbiter level.

Considering the formulation of the weight functions, f(X,Y) is provided as a function that represents the relative importance of X with respect to X as well as Y, and its value ranges between 0 and 1. A simple linear expression of f(X,Y) could be X/(X+Y). When applied to the QoS classes (i.e., the parameter C) of the inputs, this function represents the probability of selection that should be given to the left side of the AR2 node because of its QoS class.

In similar manner, the formulation of g(X,Y,U,V) is provided as a function that represents the relative importance of (X,Y) with respect to (X,Y) and (U,V). As provided in the foregoing, its value also ranges between 0 and 1, and a simple linear expression of this function could be (X+Y)/(X+Y+U+V). When applied to the queue size and queue age parametrics of the inputs, this function represents the probability of selection that should be given to the left side of the arbiter node because of its queue status, either exact (when a leaf node is involved) or mathematically "averaged" (when a higher level node is involved).

The weight factor γ is designed to control the relative importance between the QoS classes and queue status for a link. Higher γ values indicate more importance being given to the C values. Conversely, low γ values indicate higher importance of the queue parametrics. Some of the exemplary formulations of the f and g functions are provided below:

$$f(\langle C_1 \rangle, \langle C_j \rangle) = \frac{\langle C_i \rangle}{\langle C_i \rangle + \langle C_j \rangle},$$

or $$f(\langle C_1 \rangle, \langle C_J \rangle) = \frac{\langle C_1^2 \rangle}{\langle C_i^2 \rangle + \langle C_j^2 \rangle}$$

In this function definition, higher C values represent the higher priority of QoS class, lower C values represent the lower priority. The function g(X) is defined similarly such as $$g(\ldots) = \frac{(\alpha \langle QSize_i \rangle + (1-\alpha) \langle QAge_1 \rangle)}{(\alpha \langle Qsize_1 \rangle + (1-\alpha) \langle QAge_i \rangle) + (\alpha \langle QSize_j \rangle + (1-\alpha) \langle QAge_j \rangle)}$$

or $$g(\ldots) = \frac{(\alpha \langle QSize_i^2 \rangle + (1-\alpha) \langle QAge_i^2 \rangle)}{(\alpha \langle QSize_1^2 \rangle + (1-\alpha) \langle QAge_i^2 \rangle) + (\alpha \langle QSize_j^2 \rangle + (1-\alpha) \langle QAge_3^2 \rangle)}$$

where α is the weight factor between Qsize and Qage parameters, and $0 \leq \alpha \leq 1$.

Based on the foregoing discussion, the impact of the probability P on the selection process can be illustrated as follows. Assume that the queue for link i is built up since the AR2 arbiter has been favoring link j for a "long" time. In this case, $P_i$ will start increasing because the contribution from the g(X,Y) function also increases due to the elevated queue size and/or queue age associated with link i. An increase in $P_i$ will enable the AR2 arbiter to favor link i with higher percentage in the next cycle. Thus, those skilled in the art should appreciate that the arbitration process oscillates between links i and j in a self-controlled manner based on the various characteristics of the links in order to make more judicious selections.

Figure 3A:
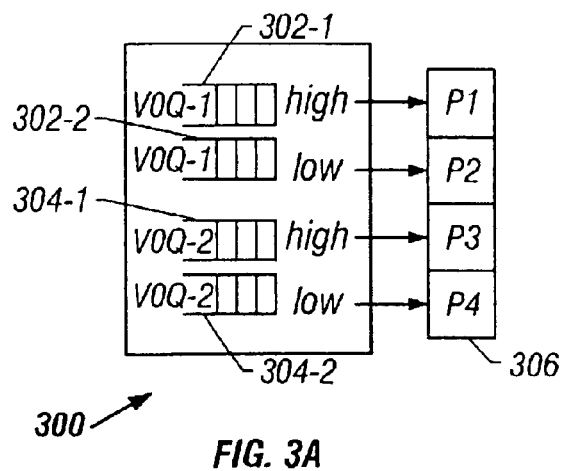
FIGS. 3A–3S depict a series of three exemplary cycles of a probabilistic BTA in the context of an illustrative network element.

FIGS. 3A–3S illustrate a series of three exemplary arbitration cycles and associated functional formulations of a P-persistent BTA in the context of a network switch element described, e.g., in the cross-referenced patent applications cited above. Reference numeral 300 refers to an input port of the switch architecture, wherein two egress destinations are provided. Each destination is further provided with two classes of service, denoted as "high" and "low". Accordingly, four requesting virtual output queues (VOQs) (VOQ-1 302-1 and VOQ-1 302-2 for one destination and VOQ-2 304-1 and VOQ-2 304-2 for the other destination) are obtained for the input port, which VOQs are mapped to the four inputs (P1 through P4) of the P-BTA as shown in FIG. 3A. Reference numeral 306 thus represents the input vector of the P-BTA 320.

Figure 3B:
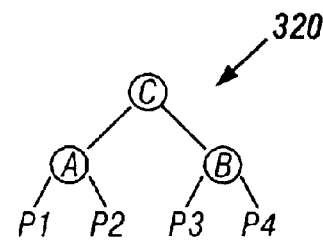

FIG. 3B depicts the four-input P-BTA 320 with three nodes, A, B and C, which are organized into a two-level tree such that node C is the root node and nodes A and B are the leaf nodes. Node A is coupled to inputs P1 and P2 and node B is coupled to inputs P3 and P4. For purposes of illustration, the following initial conditions are chosen:

The C values for high and low priorities are set at 3 and 1, respectively. This effectively gives a weight of 75% to high priority traffic via the f( ) function, where f=$\langle C_i \rangle / [\langle C_i \rangle + \langle C_j \rangle]$ and i indicates the left side of the arbiter and j indicates the right side of the arbiter. Further, these C values are assumed to be constant throughout the arbitration cycles.

The queue sizes (denoted in this example by $S_i$) are normalized, i.e., by dividing the actual size by the maximum size. A similar normalization procedure is applied to the age ($A_i$) of the oldest request in a VOQ. The arbitrary maximum age is set at 40.

The normalized $S_i$ and $A_i$ values are used to define the go function as follows: g( )=$[\alpha \langle S_i \rangle + (1-\alpha) \langle A_i \rangle]/[\alpha (\langle S_i \rangle + \langle S_j \rangle) + (1-\alpha)(\langle A_i \rangle + \langle A_j \rangle)]$.

The value for both α and γ is chosen to be 0.5. Since γ=0.5, the QoS weighs as much as the state of VOQ, which is represented by the queue length and its age. Also, the queue length and age parameters are of equal importance because α=0.5.

Figure 3C:
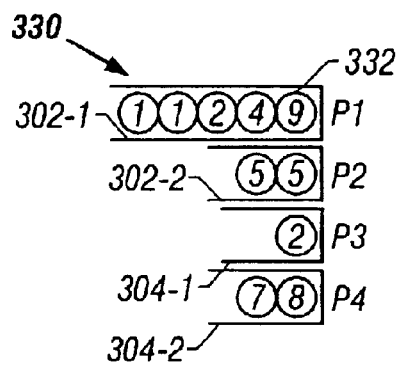
Figure 3D:
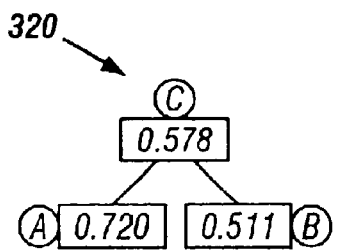

Reference numeral 330 of FIG. 3C refers to the initial state of the input port, where a circle represents a request in a VOQ and the number in the circle is the age of that particular request. For instance, VOQ-1 302-1 which is mapped to P1 of the P-BTA has five pending requests, the oldest request 332 having an age of 9 units. FIG. 3D depicts the probabilities to pick the left side (i.e., $P_i$) of each arbiter A, B and C, which are computed by using the parametrics and functional values set forth in the tables of FIGS. 3F–3I. In particular, the table shown in FIG. 3G provides the f( ) and g( ) values associated with nodes A and B, as well as the corresponding Pi values. In similar fashion, the table shown in FIG. 3I provides the f( ) and g( ) values for the node C and its corresponding $P_i$ value.

Figure 3E:
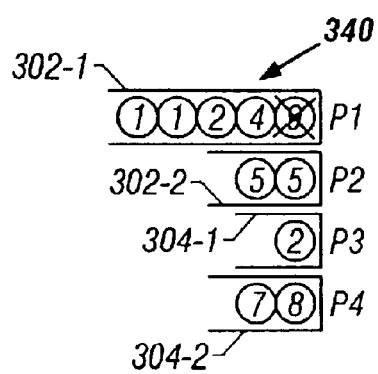

Given the $P_i$ values as set forth above, the following arbitration scenario is exemplified. Arbiter A has a $P_i$ value of 0.72 (i.e., 72%) to pick P1. Let us assume that it does so. Similarly, arbiter B has a $P_i$ value of 0.521 (52.1%) to pick P3, and let us also assume that it does so. Finally, arbiter C has a $P_i$ value of 0.547 (54.7%) to pick the left side, i.e., P1 side. Let us assume that the most probable pick is selected by the P-BTA, which is P1 in this case. Mathematically, the probability to pick P1 is essentially a multiplication of node A's $P_i$ value and node C's $P_i$ value (as the selections are independent events). For purposes of this illustration, let us also assume that P1 is picked and its service request is granted. Therefore, the first request of VOQ-1 302-1 is removed at the end of the first arbitration cycle, as shown in FIG. 3E.

In the next cycle, all the pending requests of the VOQs get older by one unit (i.e., all $A_i$ values are incremented by one). Reference numeral 350 of FIG. 3J refers to the initial state at the beginning of the second arbitration cycle. Similar to first cycle, FIG. 3K depicts the $P_i$ values associated with the three nodes of the P-BTA 320, which values are computed by using the parametrics and functional values provided in the tables of FIGS. 3M–3P. Specifically, the table shown in FIG. 3N provides the f( ) and g( ) values associated with nodes A and B, in addition to the $P_i$ values corresponding thereto. In similar fashion, the table shown in FIG. 3P provides the f( ) and g( ) values for the node C and its $P_i$ value.

Based on the second round computation of the $P_i$ values, it can be seen in FIG. 3K that the probability that arbiter node A selects P1 has decreased (from 72% to 67.5%), because it was serviced in the previous cycle. However, it is still more important than the probability to pick P2 (which is 1–$P_i$). There were neither departures or arrivals in P3 and P4, but since all the requests got older, the weight of the highest priority queue has increased more than that of the lowest priority queue. Thus, the probability to pick P3 is now 52.1% instead of 51.1%.

The following arbitration scenario is exemplified for the second arbitration cycle. Arbiter node A has a $P_i$ value of 0.675 (67.5%) to pick P1 and let us assume that it does so. Arbiter node B has a $P_i$ value of 52.1% to pick P3 but it picks P4. Root node arbiter C has a $P_i$ value of 54.7% to pick the left side (i.e., P1) but it picks the right side (i.e., P4). Let us assume once again that this request from P4 is granted and removed from the VOQ-2 304-2. In addition, let us also assume that a new request arrives in the third VOQ, i.e., VOQ-2 304-1, which is shown as dashed circle in FIG. 3L wherein reference numeral 360 refers to the state of the inputs during the second arbitration cycle.

FIG. 3Q depicts the initial state 370 of the VOQs wherein each request has aged by one unit. By going through the same steps as before, the $P_i$ values for each arbiter node can be computed. These $P_i$ values are shown for the P-BTA 320 in FIG. 3R. By assuming that each arbiter picks the most probable side, P1 is selected again and serviced, as shown in FIG. 3S where reference numeral 380 refers to the ingress port status during the third arbitration cycle.

As pointed out in the foregoing discussion, a fundamental problem in a BTA-based scheme is its inability to fairly arbitrate among a plurality of contenders in a service request environment having multiple priorities. Essentially, ensuring fairness can entail a significant computational liability. While hardware procedures involving some type of computation, e.g., averaging, for picking an entity may be fair, they are not necessarily fast. On the other hand, techniques known be sufficiently fast typically involve a fixed round robin like procedure or some other similar method that are not fair. As a consequence, the higher priority queues consume the service times in a disproportionate manner, thereby starving the lower priority queues.

Figure 4:
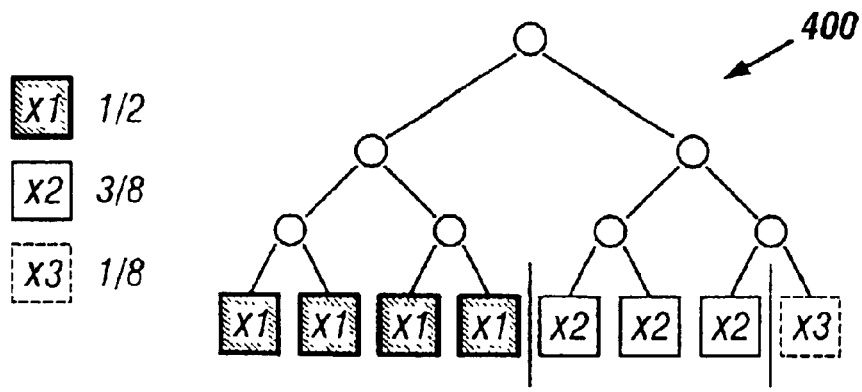
FIG. 4 depicts an exemplary three-level prioritized BTA (PBTA) provided in accordance with the teachings of the present invention.

FIG. 4 depicts an exemplary three-level prioritized BTA (PBTA) 400 in accordance with the teachings of the present invention, wherein a weighted approach is utilized for picking the contenders in a fairer way. As will be seen below, this technique is designed to arbitrate between the contending candidates from different priorities, thereby ensuring some degree of fairness.

The basic idea is to implement a BTA structure, each node of which arbitrates between its two input children, wherein the inputs comprise the children of the tree's leaf nodes. The weights of each child of the leaf nodes are preferably equal and, in exemplary embodiment, comprise a simple fraction of the total number of children of the leaf nodes. A priority is assigned according to the number of these leaf nodes chosen. The higher the number of children of the leaf nodes assigned to a particular queue (or entity), the higher is the priority of that queue.

Service weight is thus assigned to a queue based on its priority, and the weights may be assigned either statically or dynamically. In the exemplary case shown in FIG. 4, three priority levels, X1, X2 and X3, are assumed, wherein X1 is assigned a value of ½, X2 is assigned a value of ⅜ and X3 is assigned a value of ⅛. Because service requests of X1 level have a priority of ½, four out of total eight children are provided to be X1 level inputs. Likewise, three out of eight children are provided to be X2 level inputs and one out of eight children is provided to be the single X3 input. All the inputs of X1 level are connected together. Similarly, X2 inputs are connected together and X3 input(s) are connected together.

Figure 5A:
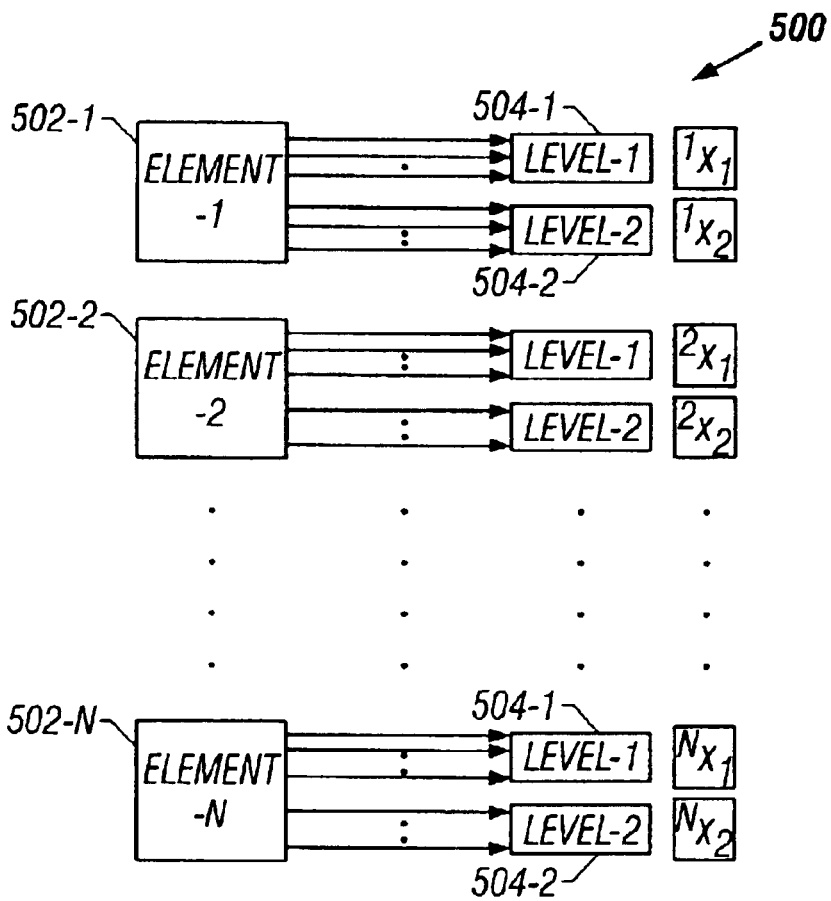
FIG. 5A depicts a system having a number of contending elements, each generating requests at two priority levels.

It should be appreciated that the scheme described above allows for only a single type of requests per priority level (i.e., an entity generating requests in only one priority level). However, in many applications requests are generated in multiple priority levels. For instance, referring now to FIG. 5A, depicted therein is a system 500 having a number of contending elements 502-1 through 502-N, each generating requests at two priority levels (X1 and X2) 504-1 and 504-2. Whereas each element may make a different number of requests at these two levels, a total of N requests are assumed to be generated at each priority level. Thus, where element-1 generates a sub-total of $^1X_1 + ^1X_2$ requests ($X_1$ Level-1 requests and $X_2$ Level-2 requests), element-2 generates a sub-total of $^2X_1 + ^2X_2$ requests, and so on, the following relationship holds: $N = ^1X_1 + ^2X_1 + \ldots\ ^NX_1 = ^1X_2 + ^2X_2 + \ldots\ ^NX_2$.

Figure 5B:
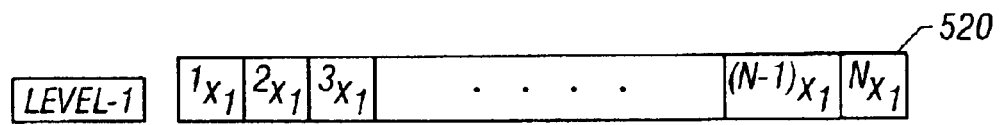
FIG. 5B is a vector representation of the requests generated by the system of FIG. 5A.
Figure 5B:
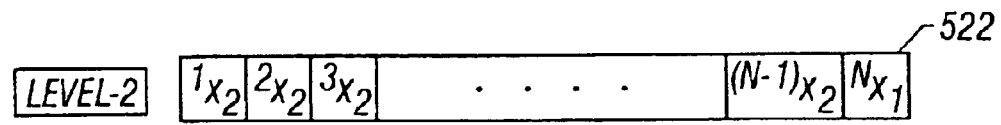

As there are two priority levels, the entire set of requests can be represented as two input vectors. FIG. 5B is a vector representation of the requests generated by the system of FIG. 5A, wherein reference numeral 520 refers to a first N-element vector associated with Level-1 requests and reference numeral 522 refers to a second N-element vector associated with Level-2 requests. Without the fair weighted priority assignment as set forth in the present patent application, a BTA sufficient to handle one request vector will require N leaves and therefore, possibly, two BTAs could be used in parallel for each priority level selection.

Figure 5C:
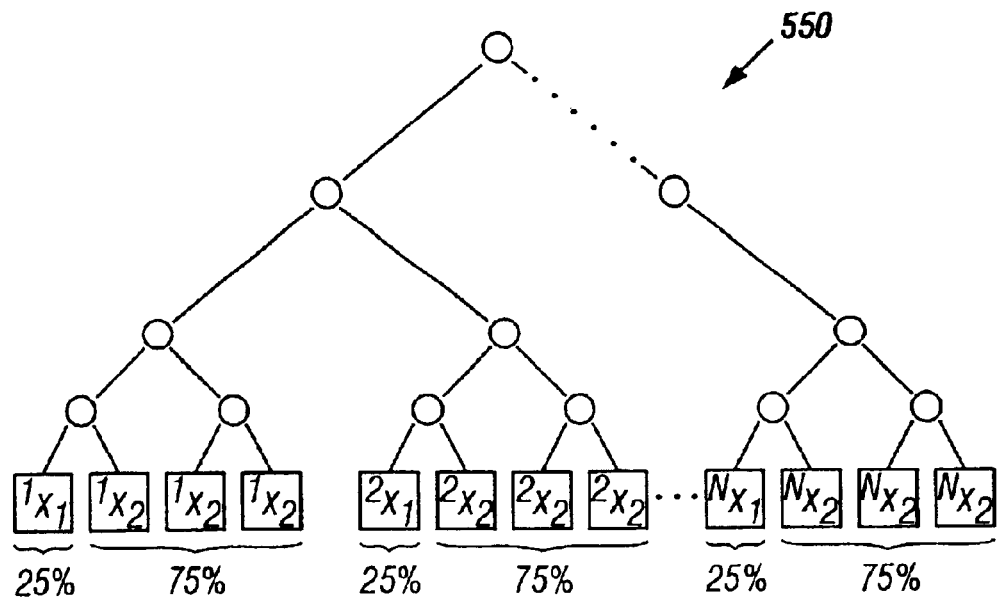
FIG. 5C is an exemplary PBTA structure for the system of FIG. 5A at two priority levels of 25% and 75%, respectively, in accordance with the teachings of the present invention.

With the fair weighted priority approach, however, a single BTA can be utilized wherein the leaf granularity can be appropriately distributed to accommodate the 25%/75% weight ratio of the example described above. By adding two more levels in the tree structure (K→K+2), the total number of tree leaves becomes 4N. Thus, N leaves can be associated with Level-1 priority and 3N leaves can be associated with Level-2 priority, by replicating each Level-2 request three times. FIG. 5C depicts an exemplary PBTA structure 550 for the system of FIG. 5A at two priority levels of 25% and 75%, respectively, wherein an arbitrary interleaving of these associations is illustrated in accordance with the teachings of the present invention.

As seen above, BTAs, which can be quite fast and need only minimal hardware, can be made inherently weighted by allowing the flipping of nodal flags to be controlled according to a priority scheme. As a generalized arrangement, furthermore, the present invention posits that the flag direction control for a BTA (which can be referred to as the primary BTA) can be conditioned on a logic structure such as yet another BTA, i.e., a secondary BTA. In a still further generalization, the flags of the secondary BTA(s) may themselves be controlled by yet another level of logic structures (e.g., tertiary BTAs). It is thus possible to implement a multi-level BTA structure where a (m+1)'ary BTA is embedded into one or more nodes of a (m)'ary BTA for controlling the flag directionality thereof.

Figure 6:
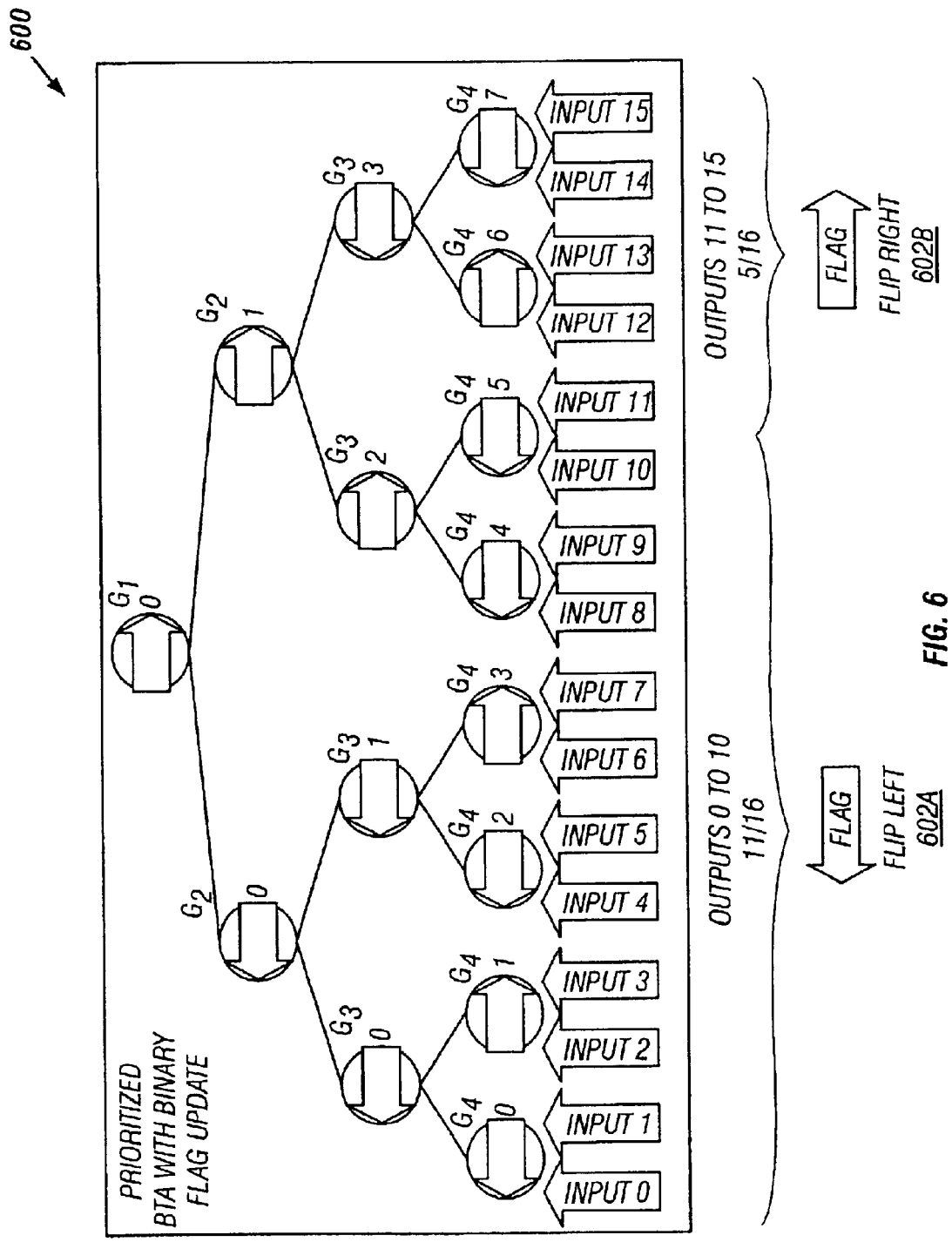
FIG. 6 depicts an exemplary 16-input PBTA for controlling a nodal flag of another BTA using an embedded scheme provided in accordance with the teachings of the present invention.

In one exemplary implementation of a multi-level embedded BTA structure, the embedded BTA controlling the flags of another BTA may be provided as a prioritized BTA, such as the PBTA scheme discussed above. The embedded PBTA in each node of the primary BTA will therefore weigh the tree according to how the left and right flips of the flag in each node are assigned a priority level. FIG. 6 depicts an exemplary 16-input PBTA 600 for controlling a nodal flag of another BTA using an embedded scheme provided in accordance with the teachings of the present invention. In this example, the left flip control 602A has 11 inputs out of a total of 16 while the right flip control 602B has only 5. If a particular node of the primary BTA was picked, according to the weighted scheme shown in FIG. 6, all 1's are applied to the inputs of the PBTA 600 and the resulting output (only one output out of 16 will be 1) is checked to see which group its falls under. If it falls in the "flip left" group, then the flag of the primary BTA node that was picked will flip to the left. Otherwise, the resulting PBTA's output will be in the "flip right" group and, accordingly, the flag controlled by the PBTA will flip to the right.

Figure 7:
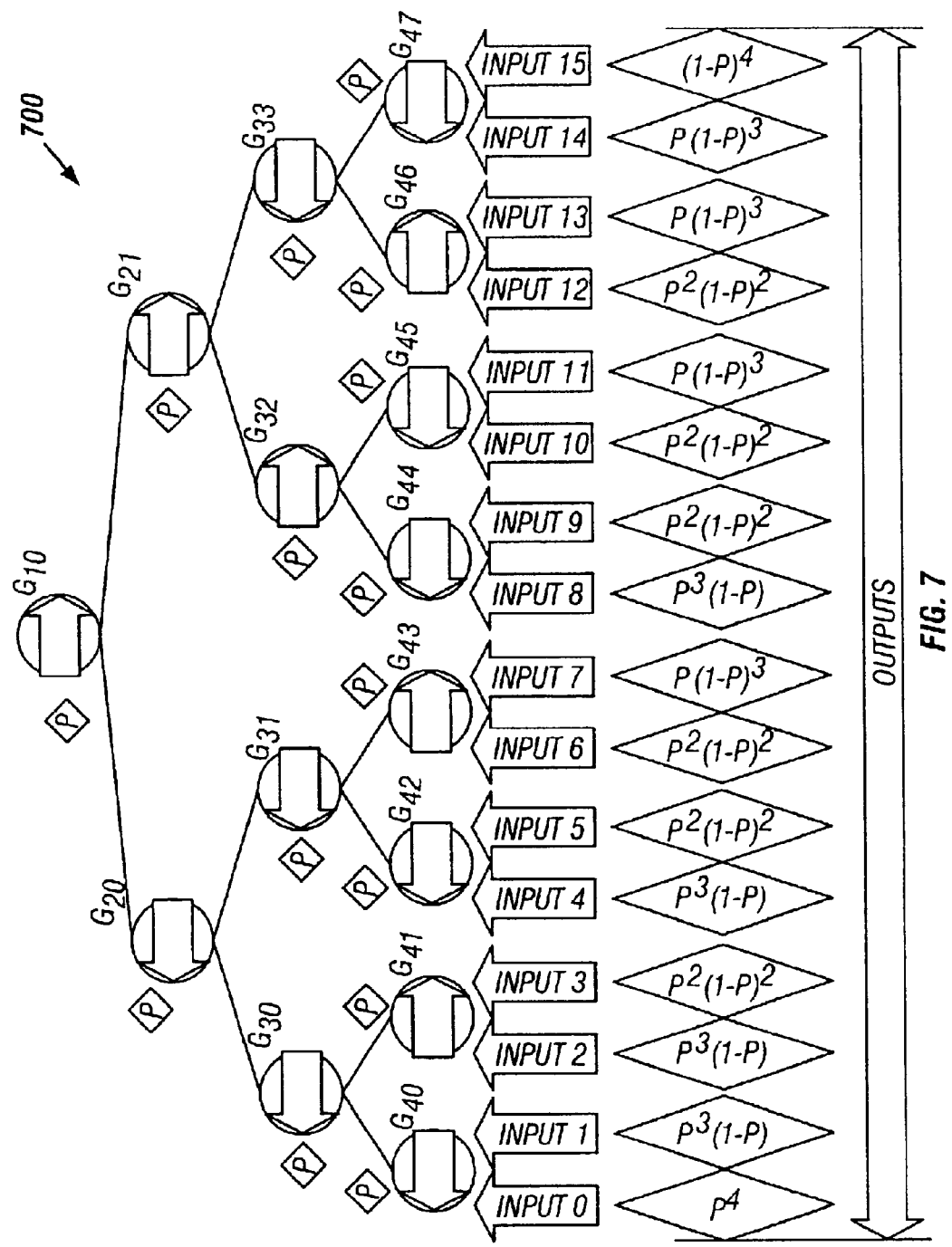
FIG. 7 depicts a probability distribution for selecting an output in an exemplary 16-input PBTA where each node has a flip priority of P.

In the general case where a priority value of P is assigned to each PBTA node, which P denotes the weight given to flipping the PBTA node's flag to the left, the probability variable associated with picking any one PBTA output follows a Bernoulli distribution. FIG. 7 depicts such an output priority distribution for a generic exemplary 16-input PBTA 700 where each node has a flip priority of P. As can be readily seen, the overall probability of picking Input 0 as the output works out to be $P^4$ (since each selection of $G_{40}$, $G_{30}$, $G_{20}$, and $G_{10}$ nodes is independent). The overall probability of picking Input 1 as the output is based on the individual selection of <right>, <left>, <left> and <left>, giving rise to the probability value of $\{P^3(1-P)\}$. Similarly, the other values in the output probability distribution can be computed.

Figure 8A:
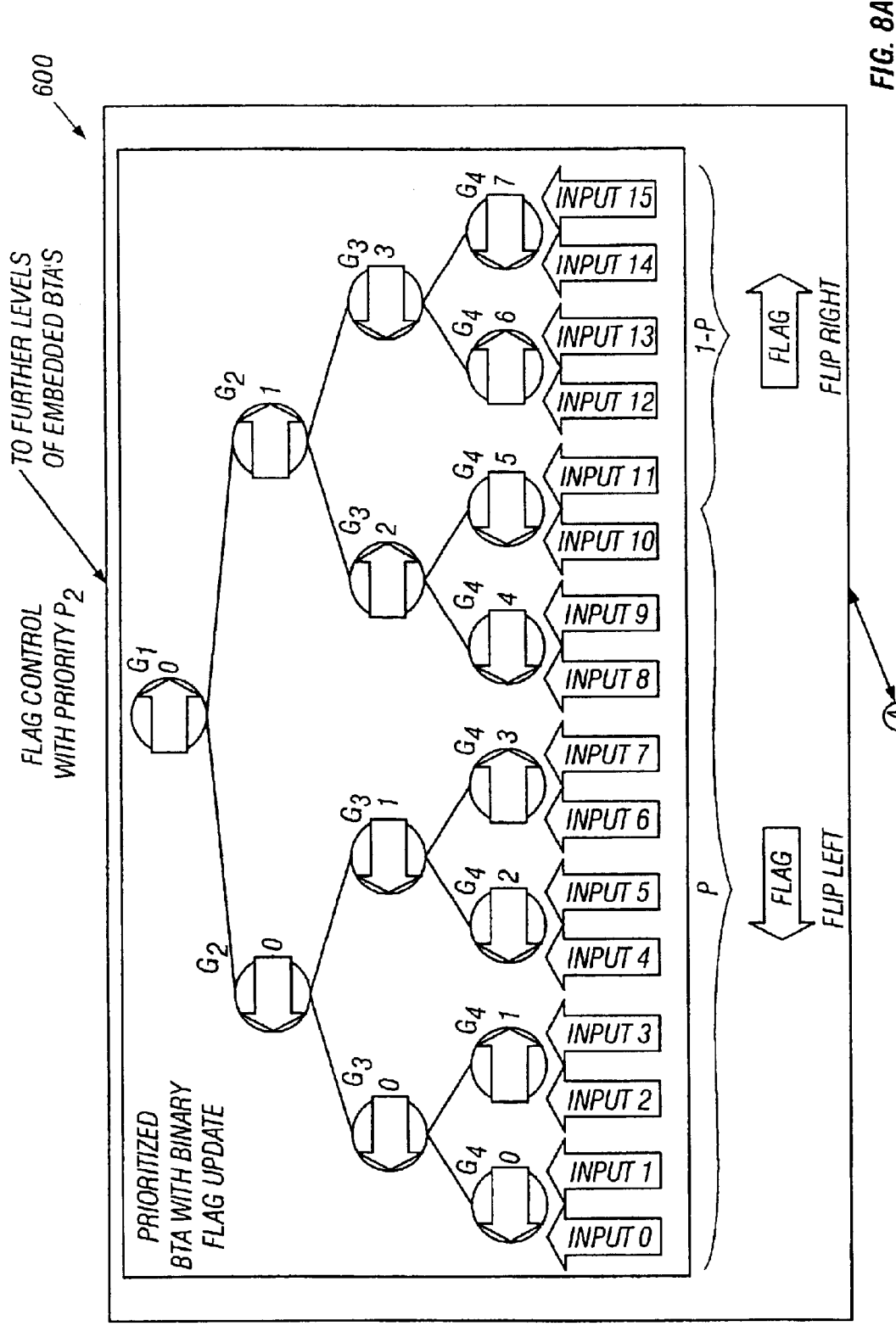
FIGS. 8A and 8B depict an exemplary multi-level embedded BTA scheme in accordance with the teachings of the present invention.
Figure 8B:
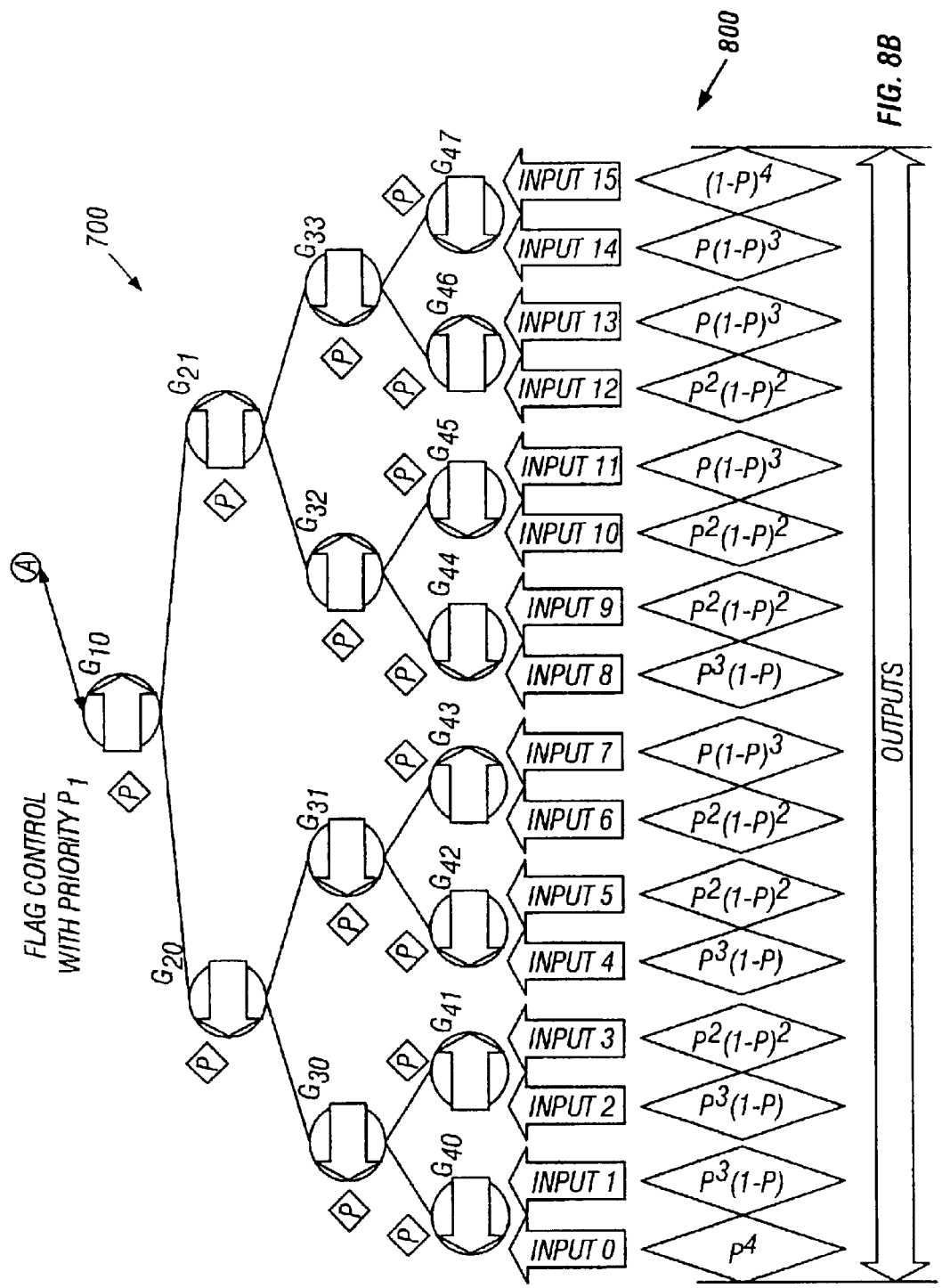

As alluded to hereinabove, an embedded BTA's nodal flags may themselves be controlled by yet another embedded BTA, giving rise to multi-level embedding. Also, the embedded BTAs on different levels may be associated with different priority values. That is, for example, the secondary BTAs embedded into the nodes of the primary BTA can be assigned a priority value of P1, while the tertiary BTAs embedded into the nodes of the secondary BTAs can be assigned a priority value of P2, and so on. FIGS. 8A and 8B depict an exemplary multi-level embedded BTA scheme 800 in accordance with the teachings of the present invention. Reference numeral 600 refers to the embedded PBTA described above for providing flag control of the primary BTA 700 with priority $P_1$. In turn, flag control for the PBTA nodes may be provided another embedded BTA (not shown) with priority $P_2$.

Figure 9A:
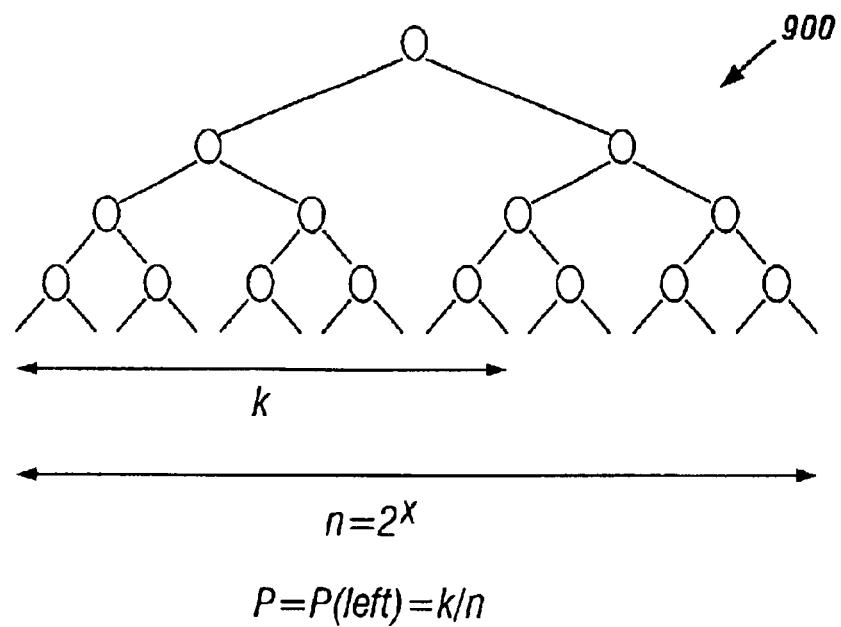
FIG. 9A depicts a PBTA for defining left and right flip priorities.

It is germane at this point to provide a summary account of the analytical underpinnings of embedded trees for the sake of completeness and further elucidation. As set forth above, the basic component for embedding trees is a conventional BTA, with archetypal flip-flop nodes. A certain number (k) of its inputs are attributed to changing the flag of an upper level node of the BTA to the left. For instance, FIG. 9A depicts a BTA 900 for defining left and right flip priorities for an upper level node. As there are n inputs, the probability to set the upper level node's flag to the left is simply k/n. Those skilled in the art should appreciate that whereas the term "probability" is used to define this quantity, a more appropriate definition might be "statistical proportion for an infinite usage." It is postulated herein that it is possible to use the same methodology for any embedding level that controls the flag direction of the upper tree node corresponding to it in a multi-level embedded scheme. Thus, one can assign k left-most inputs of an embedded tree to change the upper tree flag to the left. In the general case, let us assume that a BTA A (i.e., type-A tree, which could be a prioritized BTA) is embedded in another BTA B (i.e., type-B tree). In other words, a type-A tree is associated with each node in the type-B tree, and it controls the flip direction of the associated flag. Let us further assume that type-A trees have a probability of $P_a$ to change a type-B nodal flag to the left and a probability of $(1-P_a)$ to change it to the right. In similar manner, if the type-B trees are to be used as a flag control mechanism in an upper type-C tree, $P_b$ would define the probability to change a type-C nodal flag to the left and $(1-P_b)$ would be the probability to change it to the right.

Figure 9B:
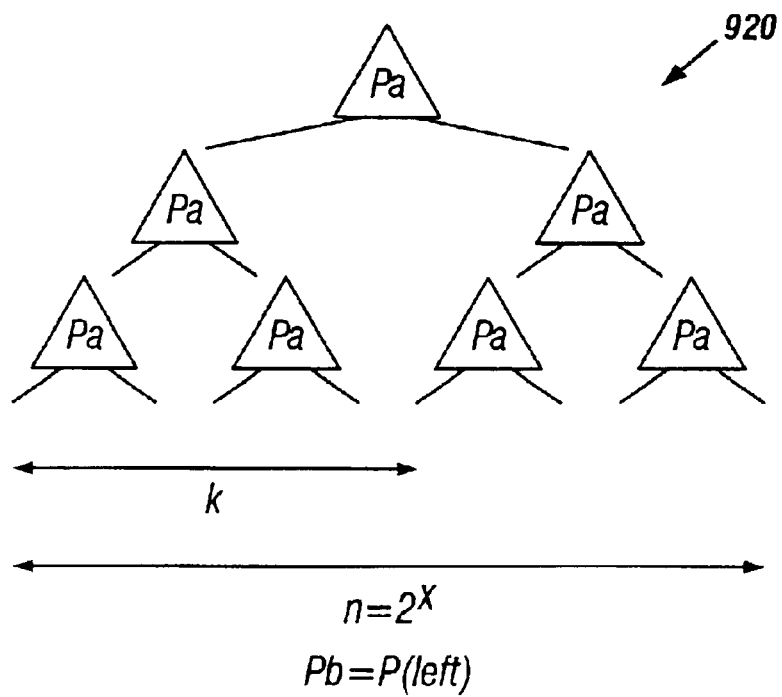
FIG. 9B depicts a first PBTA (A) embedded in another BTA (B)

FIG. 9B depicts a first PBTA (type-A tree) embedded in another BTA (type-B tree) 920 in accordance with the general principles set forth above. The resulting probability to flip an upper tree flag (i.e., a type-B nodal flag) can be computed as a function of $P_a$, k, and x (i.e., the number of tree levels). Thus, it can be seen that the upper tree maintains its own flags, and they are updated in accordance with the embedded flag control whenever the tree has been used to make a selection.

Figure 9C:
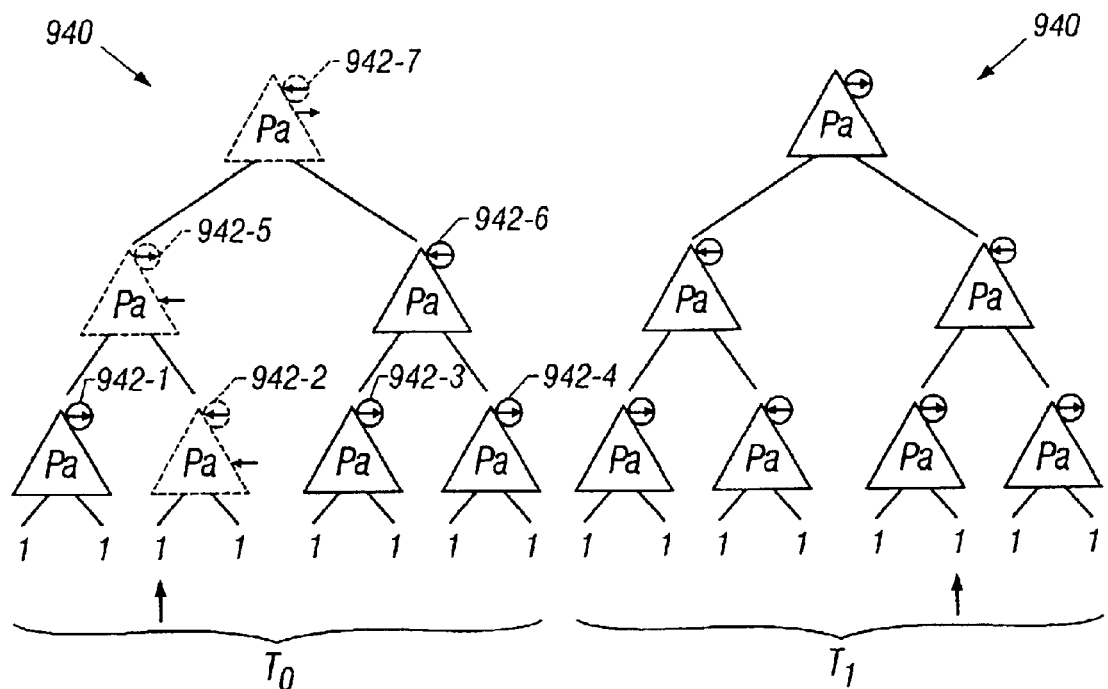
FIG. 9C depicts an exemplary scheme illustrating the use of embedded BTAs to update the flags of upper nodes of a BTA.

FIG. 9C depicts an example illustrating the use of embedded BTAs to update the flags of upper tree nodes of a BTA. Reference numeral 940 refers to an upper BTA having seven nodes (reference numerals 942-1 through 942-7), wherein each node is embedded with a lower BTA with $P_a$ to control its flag direction. As illustrated, at time $T_0$, the third input is selected according to the upper tree's flags. Then, the nodes involved in this selection (i.e., nodes 942-2, 942-5 and 942-7) use their embedded lower BTAs to flip their flags. The outcome of the lower BTA selections is shown as an un-circled arrow (indicating current flag direction) associated with these nodes. The next time (i.e, at time $T_1$) the upper level BTA 940 is used, input 6 will be picked based on the updated flag state.

It should be recognized that whereas the same type of lower BTAs were used in the above example, in the most general case, however, each lower BTA associated with an upper tree node could be different and have a unique probability value. Accordingly, the design of lower BTAs can be customized such that they allow the management of a wide range of priorities and QoS schemes without requiring complex dynamical computations.

As highlighted in the foregoing discussion, a significant issue with respect to implementing BTA-based schemes is the lack of fairness in the case of polarized traffic. To underscore this principle by way of an example, refer now to FIG. 10 wherein an exemplary 16-input BTA 1000 is provided. As is well-known, a polarized traffic situation is typically obtained when some of the inputs have requests all the time, while some other inputs are idle. Among the 16 inputs of the BTA 1000, which are mapped to 16 ports (P1–P16) of a switch, for example, Ports 1–5 and Port 10 have requests all the time while the other ports do not generate any requests. Because of the operation of a binary tree, Port 10 which is in the right half of the tree gets picked (i.e., a grant is issued to it) half of the time (i.e., 50%). Likewise, grant percentages for the inputs in the left half of the tree are obtained by apportioning the remaining 50%. Accordingly, each of P1–P4 ports is granted with a proportion of 6.25% (a total of 25%) and P5 alone is granted with a proportion of 25%. Thus, although the grant percentages total 100% for all the requesting inputs, Port 10 gets an unfair amount of service purely because of its position within the BTA.

Figure 11A:
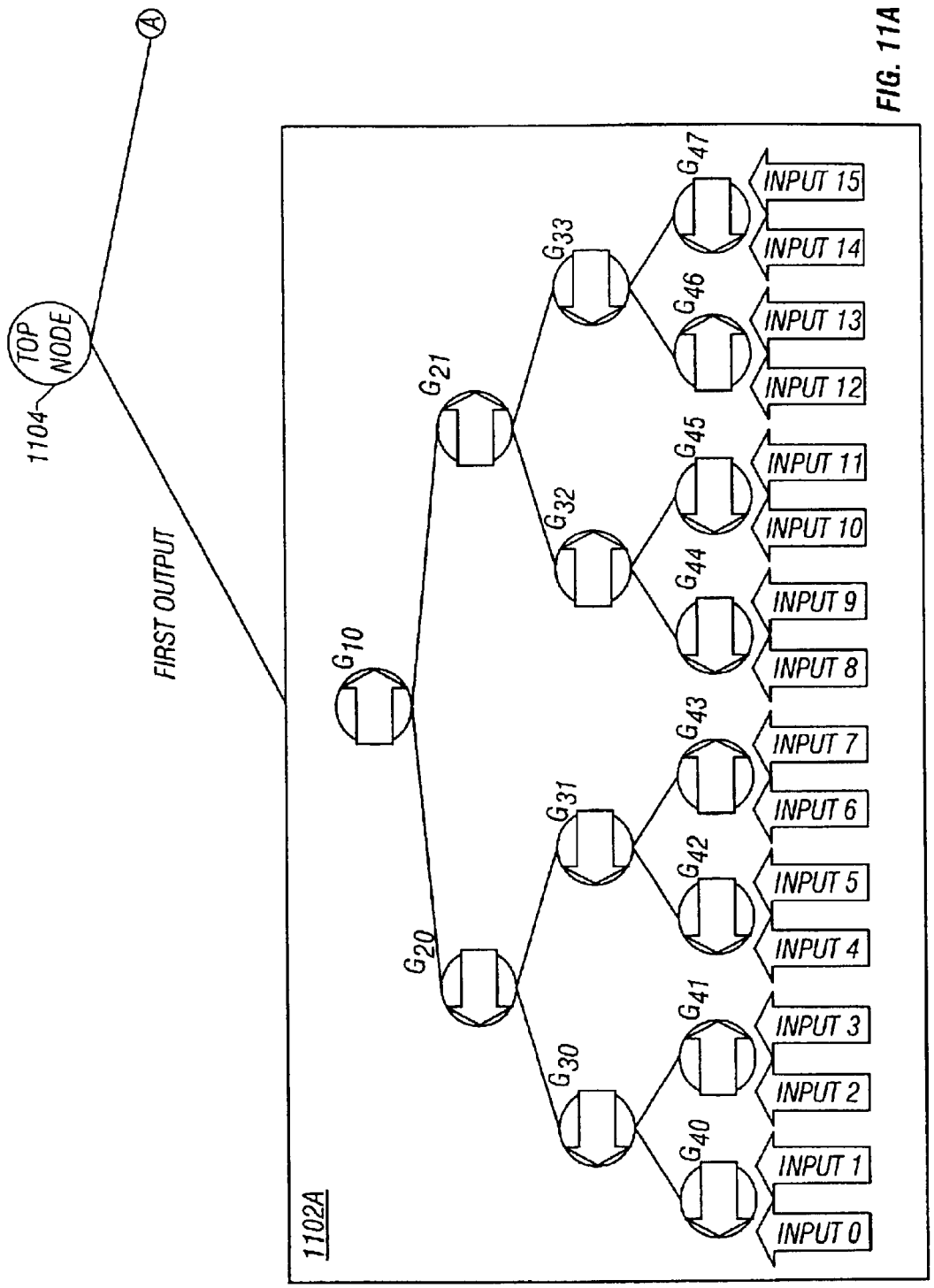
FIGS. 11A and 11B illustrate a Double BTA technique for mitigating the unfairness of BTAs in accordance with the teachings of the present invention.
Figure 11B:
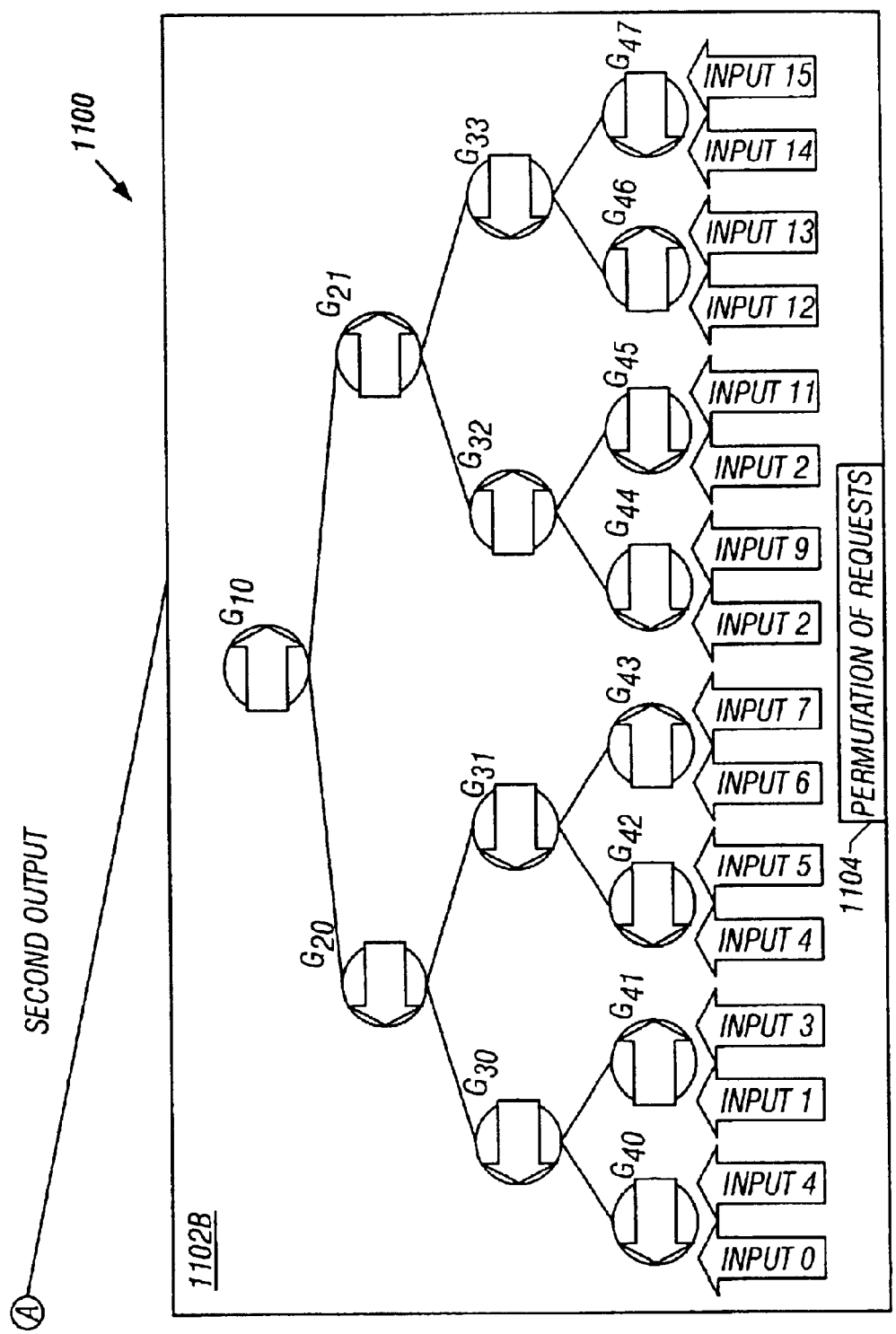

FIGS. 11A and 11B illustrate a "Double BTA" technique for mitigating the inherent unfairness of BTAs in accordance with one feature of the present invention. Essentially, the Double BTA technique involves implementing two BTAs in parallel and arbitrating between the two BTA selections by utilizing a supra-BTA node. Reference numeral 1100 refers to an exemplary Double BTA system wherein a first BTA 1102A and a second BTA 1102B are executed in parallel with respect to 16 contending entities. In one embodiment, the contending entities are mapped to the 16 inputs of BTA 1102A and BTA 1102B differently. For instance, whereas the entities are mapped to the inputs of BTA 1102A in a one-to-one sequential order (i.e., entity 1 is mapped to input 1, entity 2 is mapped to input 2, and so on), a different permutation of the entity ports may be mapped to the inputs of the other BTA, i.e., BTA 1102B. Reference numeral 1104 symbolically represents the permutated entities' requests. A top node 1104 is provided as the supra-BTA node that arbitrates between the selections of the two parallel BTAs (i.e., first and second outputs) for making the final pick. While the top node 1104 ping-pongs between the two BTAs, it does not necessarily alternate between each BTA's selection. Further, it should be realized that each BTA's own selection process and flag updating process is independent of the processes of the other BTA, and each BTA's implementation may itself involve such other variations as set forth elsewhere in this present patent application.

Figure 12:
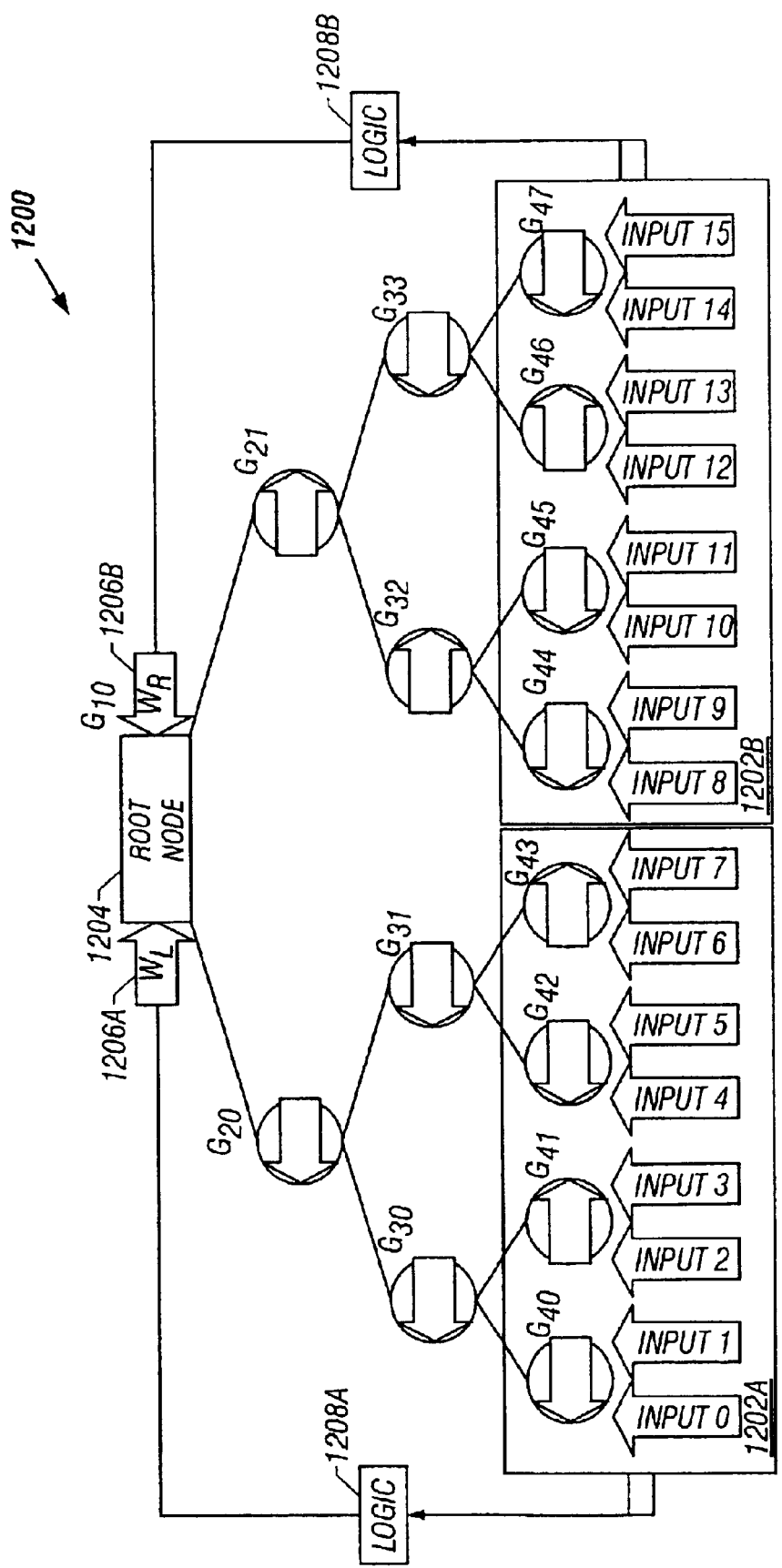
FIG. 12 illustrates a root node modification technique for mitigating the unfairness of BTAs in accordance with the teachings of the present invention.

It should be apparent that selection by the root node of a BTA structure is of paramount importance in the overall selection process, because in conventional implementations it always selects either the left half or right half of the tree. Thus, if one side has more input requests (e.g., in a polarized traffic situation), the selection by the root node of the BTA can give rise to highly unbalanced grant ratios as seen hereinabove with respect to FIG. 10. Referring now to FIG. 12, illustrated therein is an arbitration system with a root node modification technique for mitigating the inherent grant unfairness of BTAs in accordance with another feature of the present invention. Reference numeral 1200 refers to a BTA structure with 16 inputs wherein the inputs are grouped into a left side group 1202A and a right side group 1202B. In one exemplary implementation, each group comprises an equal number of inputs, i.e., balanced grouping into left and right half portions. The selection process by the left and right sub-trees with respect to each of the input groupings can be effectuated using any of the techniques set forth hereinabove. The selection of the root node 1204, on the other hand, between the left and right sides is made dependent upon some weights assigned thereto. For example, the left side weight $W_L$ 1206A can simply be based on the number of active requests (i.e., 1's in the left half portion of the request vector) available to the left side grouping 1202A. Similarly, reference numeral 1206B refers to the weight $W_R$ 1206A that is based on the number of active requests of the right side grouping 1202B.

One skilled in the art should recognize that the root node modification technique set forth above can be extended to other intermediate nodes in the tree 1200 as well, provided appropriate left and right weights can be assigned to the resultant sub-groupings. Further, in an alternative embodiment, a P-persistent tree could be used for the root node.

Figure 13A:
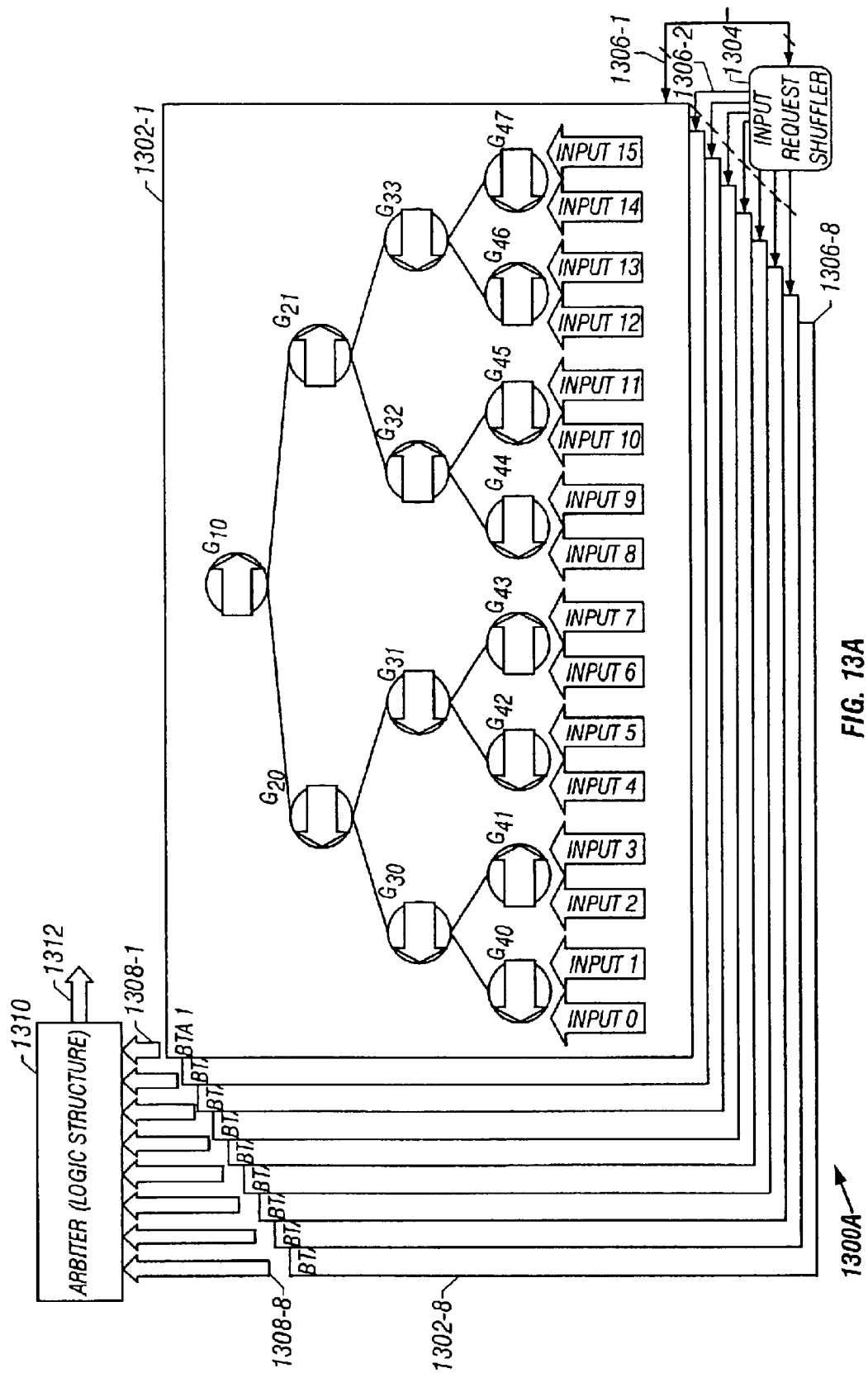
FIGS. 13A and 13B illustrate two input-shuffling techniques for mitigating the unfairness of BTAs in accordance with the teachings of the present invention.
Figure 13B:
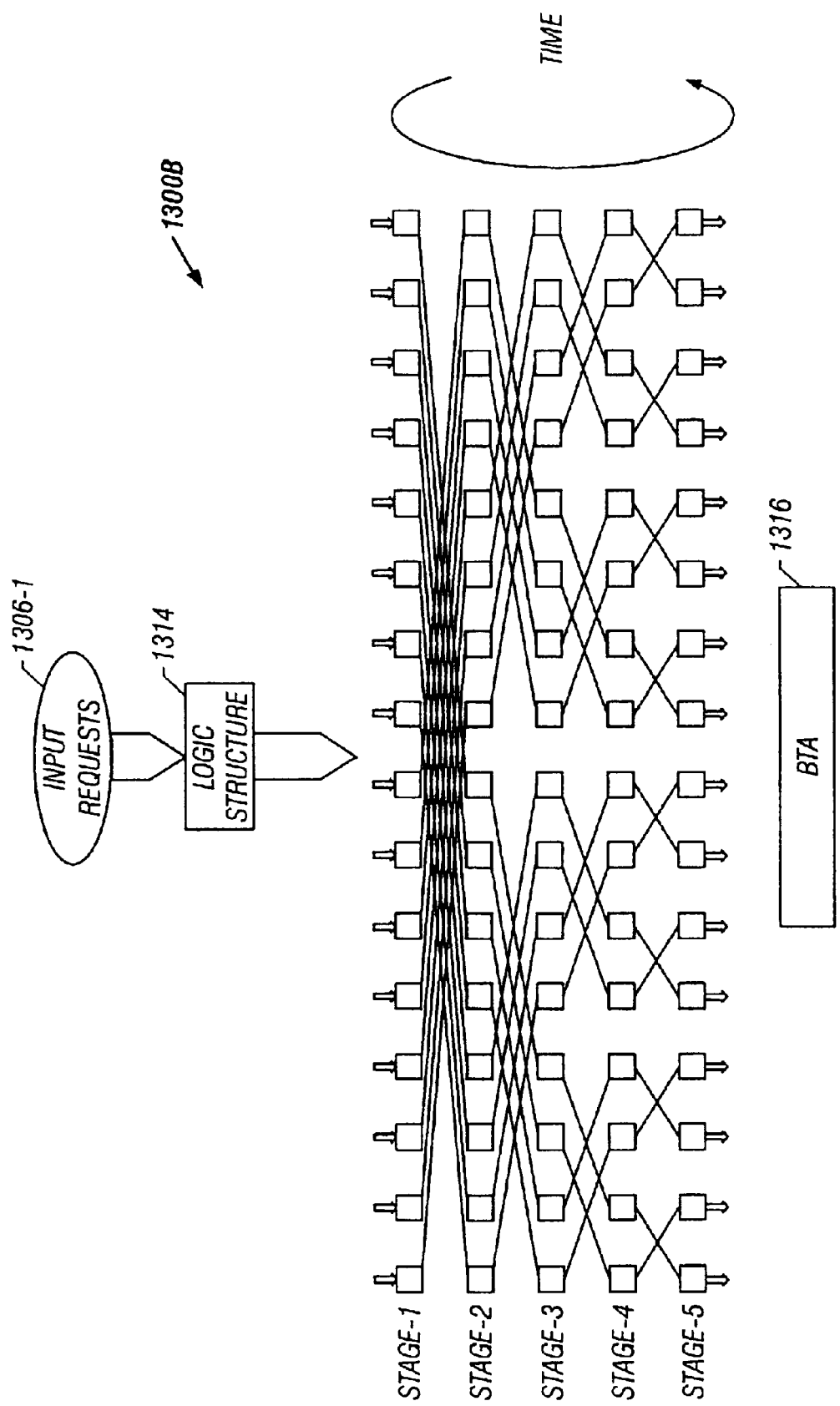

As has been expounded in great detail hereinbefore, conventional BTAs cannot issue grants to the input ports fairly in the case of polarized traffic. The present invention provides that by shuffling the mapping relationship between the BTA inputs and the contending entities, a more balanced BTA selection mechanism may be rendered. FIGS. 13A and 13B illustrate two input-shuffling techniques for mitigating the unfairness of BTAs in accordance with the teachings of the present invention. Reference numeral 1300A refers to an arbitration system for a plurality of contending entities wherein a multiple number of BTAs are executed in parallel, each BTA having a unique mapping between the BTA inputs and the contending entities' requests. In the exemplary embodiment shown, reference numerals 1302-1 through 1302-8 refer to eight parallel BTAs. An input request shuffler 1304 receiving an input request vector 1306-1 is operable to provide as many permutations and/or combinations of the input/entity mapping relationships as needed. One of the BTAs, BTA 1302-1, may be provided with the unshuffled input request vector 1306-1, whereas the remaining BTAs are provided with shuffled request vectors 1306-2 through 1306-8. The outputs of the parallel BTAs (reference numerals 1308-1 through 1308-8) are provided to a logic structure 1310 (which can be another arbiter, e.g., an RRA) that operates to select one of the eight BTA outputs as the arbitration winner. Accordingly, the selected output 1312 corresponds to the contending entity that is issued a grant in the current arbitration cycle. The BTAs themselves may thereafter update their respective flag states based on any of the mechanisms set forth in this patent application.

One aspect of the fairness issue relating to BTAs is that it comes into existence only when the set of requests stays relatively constant over a sufficient number of arbitration cycles. Referring now in particular to FIG. 13B, shown therein is another arbitration system 1300B employing a full shuffling mechanism with the context of a single BTA 1316. A series of shuffler stages are used such that for each arbitration cycle, a particular shuffle stage is provided for shuffling the mapping relationship between the contending requests 1306-1 and the BTA's input vector. Preferably, the shuffler stages—generated by a suitable logic structure 1314—operate to effectuate predetermined mapping relationships between the incoming requests and the BTA input vector. As the time progresses, the shuffling stages pass through from Stage-1 through Stage-5 and back again, thereby achieving a sufficient level of spread (or, virtual depolarization) in the inputs to enhance fairness.

Figure 14A:
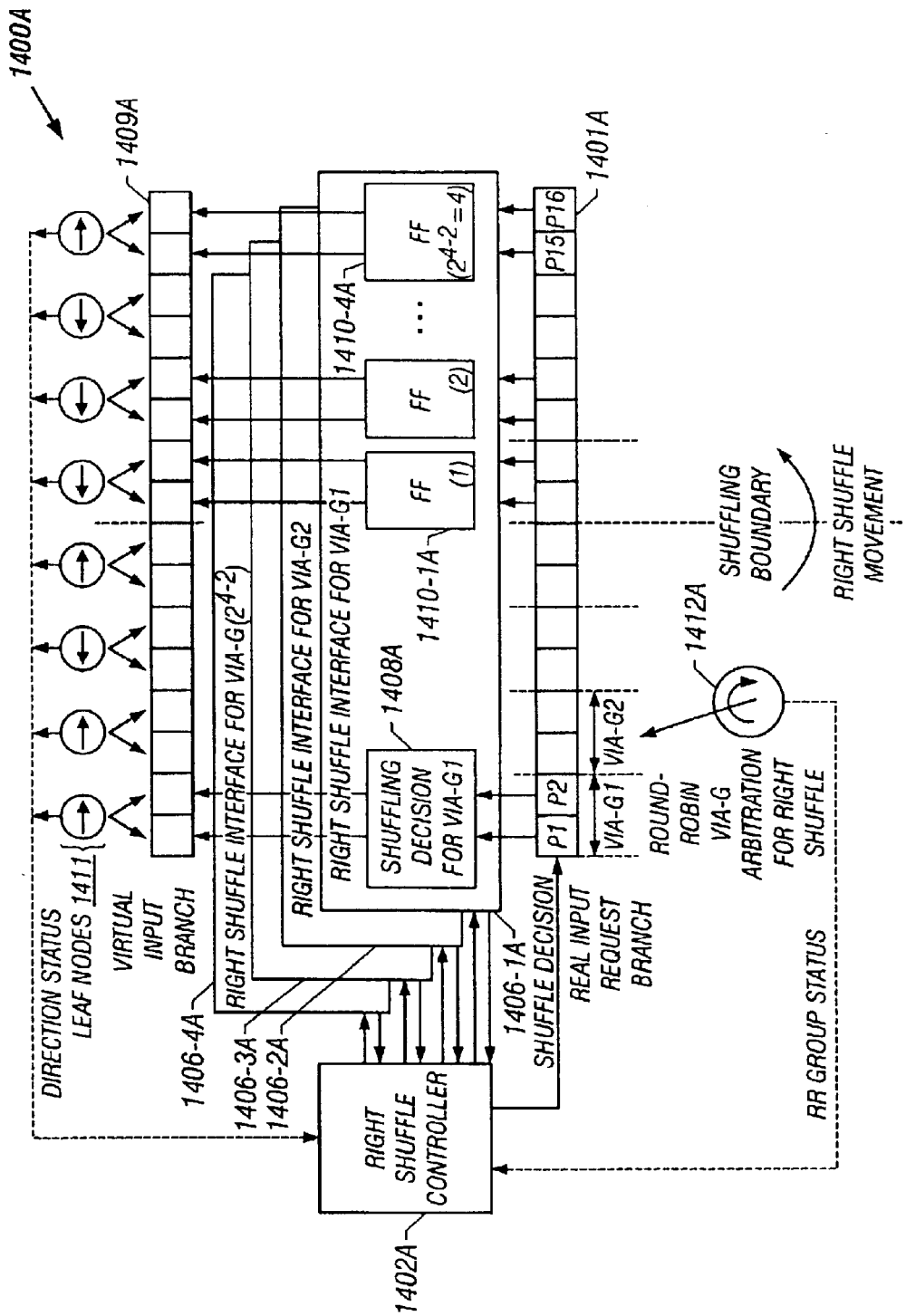
FIGS. 14A and 14B depict a virtual input shuffling scheme for mitigating the unfairness of BTAs in accordance with the teachings of the present invention.
Figure 14B:
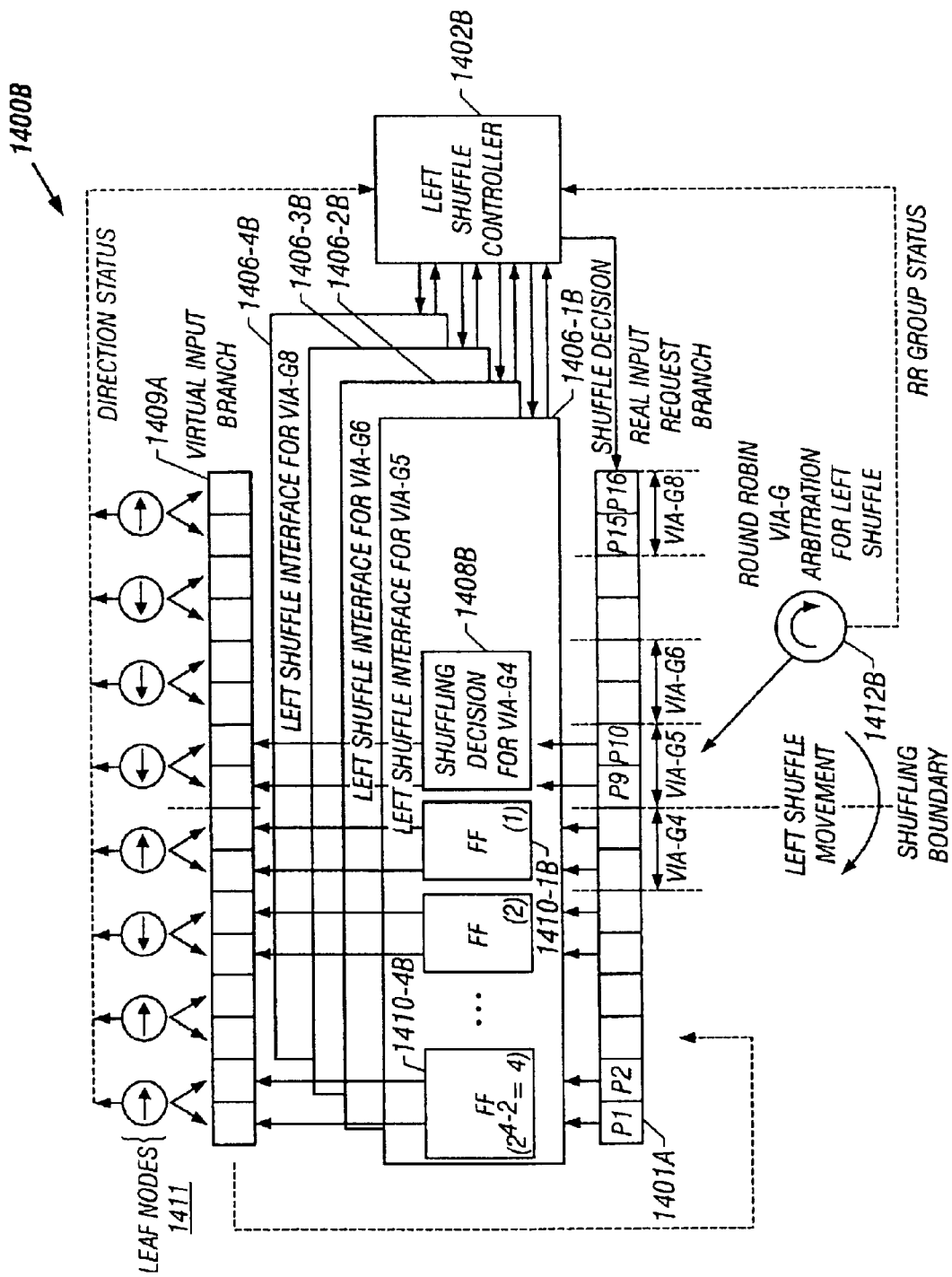

FIGS. 14A and 14B depict another input shuffling scheme for mitigating the unfairness of BTAs in accordance with the teachings of the present invention, wherein the inputs are shuffled, if necessary, into a virtual input branch. Each BTA is preferably provided with one right shuffler and one left shuffler. The input request vector is segmented into two portions, a left portion and a right portion, with a shuffling boundary therebetween. Each shuffler is designed to virtually map inputs from one portion to the other portion based on a shuffling logic mechanism that operates on a minimum amount of clock delay.

In a presently preferred exemplary embodiment, both shufflers have the same architecture: a plurality of shuffle interfaces, each representing a pair of input ports; a shuffle pointer to indicate the shuffle interface at which the shuffling procedure will start for a particular arbitration cycle; and a shuffle controller, which controls and carries the signals between the currently active shuffle interface, shuffle pointer and the leaf nodes of the BTA to which the virtual input branch is coupled.

Referring now to FIG. 14A in particular, depicted therein is an exemplary right shuffler 1400A which shuffles some of the first N/2 port inputs of a real input request port branch 1401A (i.e., the left half portion) to the other side, i.e., the right half portion, of the virtual input branch. Each pair of consecutive input ports in the real input request branch is treated as a virtual input arbiter group (VIA-G). With the 16 input ports shown, accordingly, there are four such groupings, VIA-G1 through VIA-G4, in the left half portion of the real input request branch 1401A, each of which is associated with a shuffle interface (reference numerals 1406-1A through 1406-4A). A RRA-type mechanism 1412A may be provided as a right shuffle interface pointer, that is operable to select the particular VIA-G (and the corresponding shuffle interface) at which the shuffling process is supposed to commence for any arbitration cycle.

A right shuffle controller 1402A is operable to collect the following: (i) the flag status from the leaf nodes 1411 of the BTA (not shown); and (ii) the status of the VIA-G arbitration mechanism 1412A, and in response thereto, provides (a) shuffle control signals to the right shuffle interfaces 1406-1A through 1406-6A, and (b) a shuffle decision signal to the real input request branch 1401A. Each right shuffle interface, which is associated with a particular VIA-G, includes the following: a shuffling decision block 1408A with respect to the VIA-G, and a number of flip-flops (FFs) (equaling $2^{(K-2)}$, where K=number of BTA levels) (reference numerals 1410-1A through 1410-4A). The shuffling decision blocks and the FFs operate in concert to map the requests in the real input request branch 1401A to the virtual input branch 1409A wherein one or more of the requests in the left half are shuffled to the right half, on an "as-needed" basis. That is, there may be situations where no shuffling will be necessary. The detailed description of the shuffling controller mechanism including the operation of the FFs will be provided hereinbelow.

FIG. 14B depicts an exemplary left shuffler 1400B which shuffles some of the second N/2 port inputs of a real input request branch 1401A (i.e., the right half portion) to the other side, i.e., the left half portion, of the virtual input branch 1409A. It should be appreciated by those skilled in the art that in a presently preferred exemplary embodiment, the left shuffler 1400B is essentially similar to the right shuffler 1400A described above, mutatis mutandis, with corresponding left shuffle interfaces 1406-1B through 1406-1B, an arbitration-based left shuffle interface pointer mechanism 1412B, and a left shuffle controller 1402B. Also, the shuffle interface structures include a shuffling decision block 1408B and a plurality of FFs 1410-1B through 1410-4B, as before.

Figure 15:
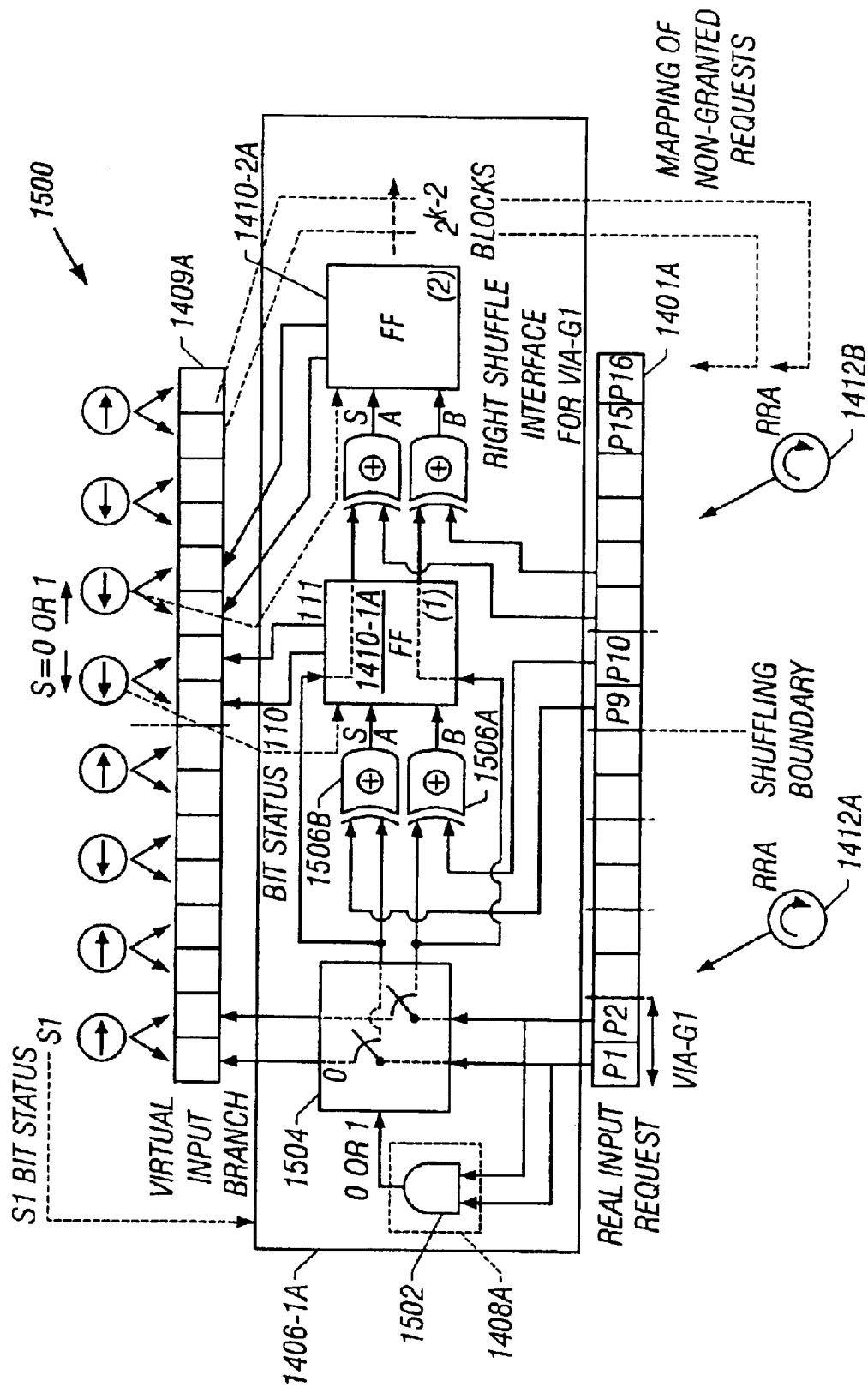
FIG. 15 is a functional block diagram of a shuffling mechanism for use in the virtual input shuffling scheme of the present invention.

FIG. 15 is a functional block diagram of a right shuffling mechanism 1500 for use in the virtual input scheme of the present invention. The details of a left shuffling mechanism are essentially similar and, accordingly, will not be described separately. For purposes of illustration, let us assume that the RRA 1412A points to the first grouping pair, i.e., VIA-G1, for the current arbitration cycle. Consequently, the two input ports, P1 and P2, send the requests to the right shuffle interface 1406-1A. In the shuffling decision block 1408A, these two input request signals are provided to an AND gate 1502. If the output is 0, there is at least one port that does not have any request, so the port pair is not a candidate for shuffling. The decision block 1408A accordingly will pass the requests to the virtual input branch 1409A as they are.

If the AND gate 1502 results in a logic 1, then there is a request from each port, and the VIA-G1 port pair is a candidate for shuffling. The shuffle interface 1406-1A then searches for a port pair with no requests (i.e., "00") in the right side of the real input request port branch 1401A, starting with the first two ports from the shuffling boundary (i.e., P9–P10). In one embodiment, two Exclusive-OR (XOR) gates 1506A and 1506B are utilized. XOR 1506A logically adds P1 and P9 inputs, with the output being A. Similarly, XOR 1506B logically adds P2 and P10 inputs, with the output being B. The outputs A and B, and an indication S indicating the flag direction of the leaf arbiter node associated with the "target" port pair (P9–P10) are provided to the first FF 1410-1A.

By way of example, assume that both P1 and P2 have requests and P9 and P10 have no requests. The leaf node associated with [P1,P2] pair (i.e., "source" port pair) has its flag pointed to the right direction (i.e., a binary "1"), which means P1 will not served in the current arbitration cycle. Accordingly, P1 is the right candidate for virtual shuffling via mapping. The leaf node associated with [P9,P10] pair has a flag pointed to the left direction (i.e., a binary "0"), which means if any request is mapped to P9, it will be served. Thus, the shuffle mechanism logic operates to map the P1 input request of the real request port branch 1401A to the P9 input of the virtual branch 1409A.

In the exemplary embodiment shown in FIG. 15, signal S1 is the flag bit status relating to the leaf arbiter nodes associated with source port pairs (i.e., the port pairs left of the shuffling boundary). In addition to the A, B, and S inputs, the first FF 1410-1A is also provided with the S1 status signal. The FF's output logic is follows:

| A | B | S1 | S | Result |
|---|---|----|----|--------|
| 1 | 1 | 0 | 0 | Shuffle P2 to P9 |
| 1 | 1 | 0 | 1 | Shuffle P2 to P10 |
| 1 | 1 | 1 | 0 | Shuffle P1 to P1 |
| 1 | 1 | 1 | 1 | Shuffle P1 to P10 |
| 0 | x | x | x | [P9,P10] ≠ [0,0] --> Go to Next FF |
| x | 0 | x | x | [P9,P10] ≠ [0,0] --> Go to Next FF |

Preferably, if the first FF block shuffles any requests from the source pair [P1,P2] to any place in the target pair [P9,P10], this shuffle information is passed to the virtual input branch and the right shuffle controller to effectuate the appropriate mapping. Upon completion of the VIA-G1 shuffle, the shuffle controller polls the right shuffle interface associated with the VIA-G2 grouping to commence the shuffling process from where the VIA-G1 shuffle interface completed its process. For example, if the VIA-G1 shuffle interface successfully terminated at the first FF block 1410-1A (i.e., at least one request from the first source port pair is re-mapped to the first target pair), the VIA-G2 shuffle interface starts its shuffling mechanism at the second FF block 1410-2A. If the VIA-G1 shuffle interface was unsuccessful, that is, no requests from the first source port pair could be re-mapped to any location in the right portion, the controller mechanism stops and, preferably, the left shuffling mechanism can then commence from one of the VIA-G5 through VIA-G8 locations based on the left shuffle arbitration pointer 1412B.

Before a new arbitration cycle is commenced, the non-granted requests at the virtual input branch 1409A are copied to the real input request port branch 1401A in order to take the non-granted requests into account again. The right shuffle mechanism starts in the next cycle from where it left off in the previous cycle's right shuffle process (i.e., by actuating the appropriate right shuffle interface as indicated by the current VIA-G arbitration pointer).

Figure 10:
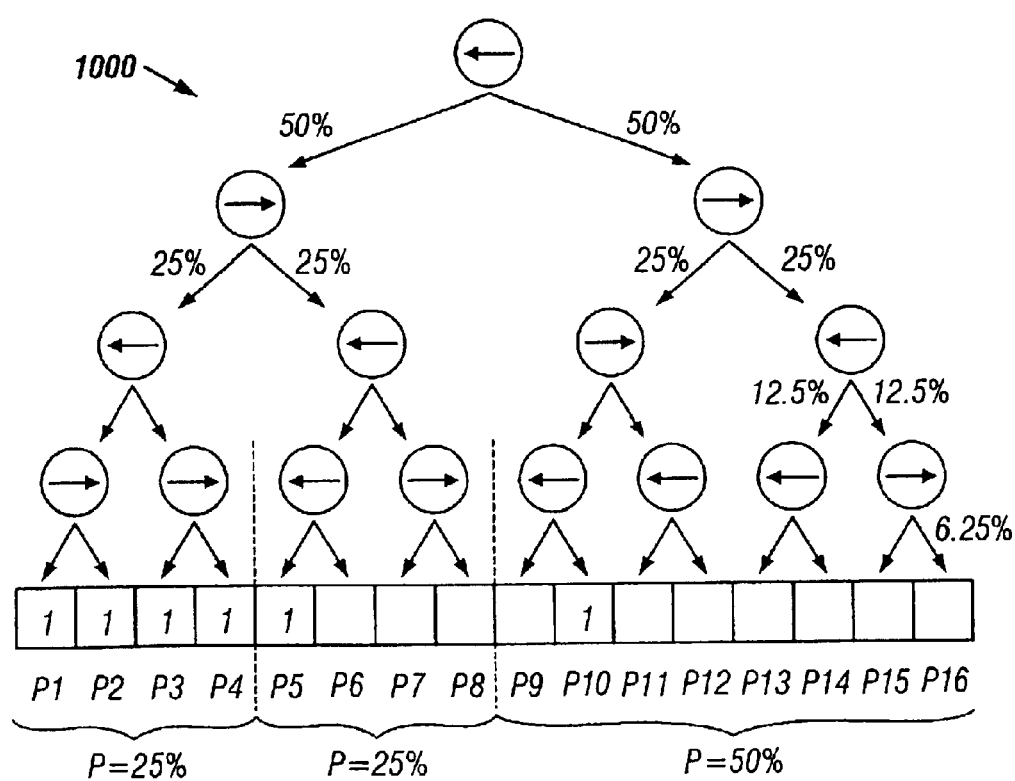
FIG. 10 is an exemplary 16-input BTA illustrating the unfairness problem of BTAs.
Figures 16A, 16B:
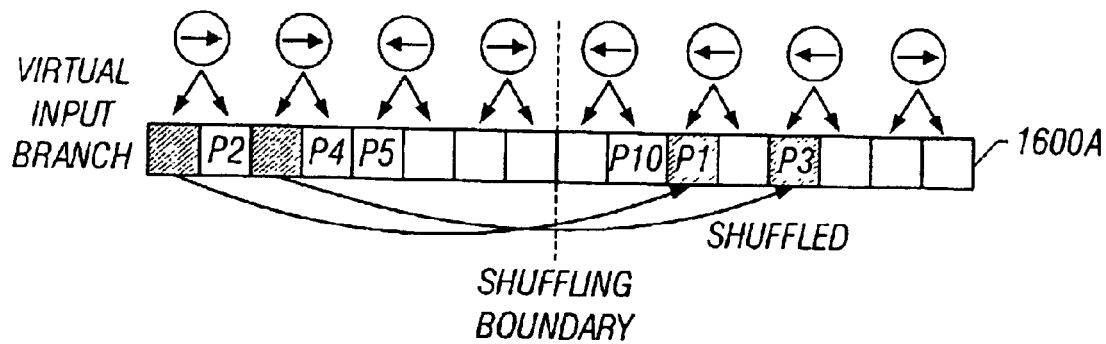
FIG. 16A depicts the shuffled inputs in a virtual input branch associated with the exemplary 16-input BTA of FIG. 10.
FIG. 16B depicts a table of grant percentages for the exemplary 16-input BTA of FIG. 10 with and without virtual input shuffling.

Referring back to the exemplary 16-input BTA shown in FIG. 10, the real input request vector therein had requests at P1–P5 and at P10. FIG. 16A depicts the shuffled inputs in a virtual input branch 1600A associated therewith, wherein P1's and P3's requests are shuffled to P11 and P13 in accordance with the shuffling process set forth hereinabove. FIG. 16B depicts a table 1600B of grant percentages for the exemplary 16-input BTA of FIG. 10 with and without virtual input shuffling. As can be readily seen, the Grant percentages with the present invention's shuffling mechanism are more evenly balanced, thereby increasing the odds of providing fairer service to the contending entities.

Based on the foregoing, those skilled in the art should appreciate that the present invention provides a set of innovative techniques for enhancing the BTA functionality, especially in the context of polarized traffic. It is believed that the operation and construction of the present invention will be apparent from the Detailed Description set forth hereinabove. While the exemplary embodiments of the invention shown and described have been characterized as being preferred, it should be readily understood that various changes and modifications could be made therein without departing from the scope of the present invention as set forth in the following claims.

What is claimed is:

1. A system for arbitrating among N competing entities, each entity operating to generate a service request, said system comprising:

a tree structure having (N−1) arbiter nodes organized into K levels, where $N=2^K$ and said levels are designated Level-1 through Level-K;

each Level-1 arbiter nods operating to select between two competing service requests, and at least one arbiter node at a higher level, designated as a Level-i node, is operable to select between two competing outputs generated by two lower level arbiter nodes (designated as Level-(i-1) nodes) coupled thereto, said competing service requests and said competing outputs being collectively referred to as competing links;

each arbiter node having a direction indicator associated therewith, said direction indicator for indicating a particular link that said each arbiter node will pick out of a pair of competing links; and a logic structure for determining a probability value associated with said direction indicator based on a set of predetermined factors relating to said pair of competing links, wherein said probability value associated with said direction indicator is determined based on a composite weighted function having at least a queue size factor relating to each of said pair of competing links; and wherein, for each particular link of said pair of competing links coupled to said Level-i node, said queue size factor is derived based on an averaging function of queue size factors corresponding to a sub-tree that supports said each particular link.

2. The system for arbitrating among N competing entities as set forth in claim 1, wherein said direction indicators are reset for each arbitration cycle with updated probability values.

3. The system for arbitrating among N competing entities as set forth in claim 1, wherein said tree structure and said logic structure are implemented in hardware.

4. The system for arbitrating among N competing entities as set forth in claim 1, wherein said averaging function comprises a weighted linear function of said queue size factors.

5. The system for arbitrating among N competing entities as set forth in claim 3, wherein said hardware comprises a field-programmable gate array (FPGA) device.

6. The system for arbitrating among N competing entities as set forth in claim 3, wherein said hardware comprises an application-specific integrated circuit (ASIC) device.

7. A system for arbitrating among N competing entities, each entity operating to generate a service request, said system comprising:

a tree structure having (N−1) arbiter nodes organized into K levels, where $N=2^K$ and said levels are designated Level-1 through Level-K;

each Level-1 arbiter node operating to select between two competing service requests, and at least one arbiter node at a higher level, designated as a Level-i node, is operable to select between two competing outputs generated by two lower level arbiter nodes (designated as Level-(i-1) nodes) coupled thereto, said competing service requests and said competing outputs being collectively referred to as competing links;

each arbiter node having a direction indicator associated therewith, said direction indicator for indicating a particular link that said each arbiter node will pick out of a pair of competing links; and a logic structure for determining a probability value associated with said direction indicator, based on a set of predetermined factors relating to said pair of competing links, wherein said probability value associated with said direction indicator is determined based on a composite weighted function having at least a queue age factor relating to each of said pair of competing links.

8. The system for arbitrating among N competing entities as set forth in claim 7, Wherein, for each particular link of said pair of competing links coupled to said Level-i node, said queue size factor is derived based on an avenging function of queue age factors corresponding to a sub-tree that supports said each particular link.

9. The system for arbitrating among N competing entities as set forth in claim 8, wherein said averaging function comprises a weighted linear function of said queue age factors.

10. A system for arbitrating among N competing entities, each entity operating to generate a service request, said system comprising:

a tree structure having (N−1) arbiter nodes organized into K levels, where $N=2^K$ and said levels are designated Level-1 through Level-K;

each Level-1 arbiter node operating to select between two competing service requests, and at least one arbiter node at a higher level, designated as a Level-i node, is operable to select between two competing outputs generated by two lower level arbiter nodes (designated as Level-(i-1) nodes) coupled thereto, said competing service requests and said competing outputs being collectively referred to as competing links;

each arbiter node having a direction indicator associated therewith, said direction indicator for indicating a particular link that said each arbiter node will pick out of a pair of competing links; and a logic structure for determining a probability value associated with said direction indicator based on a set of predetermined factors relating to said pair of competing links, wherein said probability value associated with said direction indicator is determined based on a composite weighted function having at least a service class factor relating to each of said pair of competing links.

11. The system for arbitrating among N competing entities as set forth in claim 10, wherein, for each particular link of said pair of competing links coupled to said Level-i node, said service class factor is derived based on an averaging function of service class factors corresponding to a sub-tree that supports said each particular link.

12. The system for arbitrating among N competing entities as set forth in claim 11, wherein said averaging function comprises a weighted linear function of said service class factors.

13. A system for arbitrating among N competing entities, each entity operating to generate a service request, said system comprising:
 a binary tree arbiter (BTA) having (N−1) arbiter nodes organized into K levels, where $N=2^K$ and said levels are designated Level-1 through Level-K, wherein said Level-1 nodes are associated with N inputs that are assignable to N service requests; and
 a structure for staging said N service requests into a plurality of predetermined stages, each stage for effectuating a particular mapping relationship between said N service requests and said N inputs, wherein said structure is operable to select one of said predetermined stages for any particular arbitration cycle of said BTA; and
 wherein said predetermined stages are operable to map said N service requests to said N inputs in a full shuffle mapping.

14. The system for arbitrating among N competing entities as set forth in claim 13, wherein said structure is operable to select one of said predetermined stages in a cyclical manner.

15. The system for arbitrating among N competing entities as set forth in claim 14, wherein each of said predetermined stages maps said N service requests to said N inputs in a unique manner.

16. The system for arbitrating among N competing entities as set forth in claim 14, wherein each of said predetermined stages maps said N service requests to said N inputs in a manner such that each input is assigned a different service request for each arbitration cycle.

17. The system for arbitrating among N competing entities as set forth in claim 14, wherein said BTA is comprised of a prioritized BTA.

18. The system for arbitrating among N competing entities as set forth in claim 14, wherein at least one of said arbiter nodes is embedded with another BTA, referred to as a secondary BTA.

19. The system for arbitrating among N competing entities as set forth in claim 14, wherein each arbiter node is provided with a flag for facilitating arbitration between two links coupled thereto, said flag being resettable with a probability value for each arbitration cycle bused on a plurality of Quality of Service (QoS) parameters associated with said two links.

20. A system for arbitrating among N competing entities, each entity operating to generate a service request, said system comprising:
 a binary tree arbiter (BTA) structure having (N−1) arbiter nodes organized into K levels, where $N=2^K$ and said levels are designated Level-1 through Level-K, wherein said Level-K node is designated as a root node supported by a left sub-tree and a right sub-tree, said left sub-tree corresponding to a left half portion of N/2 inputs and said right sub-tree corresponding to a right half portion of N/2 inputs, said left and right portions forming a virtual input branch for said BTA structure;
 at least one shuffle interface including:
  means for determining which pair of adjacent service request ports in a left half portion of a real request port branch is eligible for mapping a real request thereat to a virtual input in said right half portion of said virtual input branch; and
  means operable to effectuate a mapping of a real request from said pair of adjacent service request ports to said virtual input, if necessary; and
 a shuffle controller for controlling said at least one shuffle interface responsive at least in part to a flag status signal received from Level-1 arbiter nodes.

21. The system for arbitrating among N competing entities as set forth in claim 20, wherein said at least one shuffle interface comprises N/4 shuffle interfaces, each of which corresponds to a particular adjacent port pair in said left half portion of said real request port branch.

22. The system for arbitrating among N competing entities as set forth in claim 21, further comprising a shuffle interface pointer for selecting a particular shuffle interface for any arbitration cycle.

23. The system for arbitrating among N competing entities as set forth in claim 22, wherein said shuffle interface pointer comprises a round robin arbiter (RRA) mechanism.

24. A system for arbitrating among N competing entities, each entity operating to generate a service request, said system comprising:
 a binary tree arbiter (BTA) structure having (N−1) arbiter nodes organized into K levels, where $N=2^K$ and said levels are designated Level-1 through Level-K, wherein said Level-K node is designated as a root node that is supported by a left sub-tree and a right sub-tree, said left sub-tree corresponding to a left half portion of N/2 inputs and said right sub-tree corresponding to a right half portion of N/2 inputs, said left and right portions forming a virtual input branch for said BTA structure;
 at least one shuffle interface including:
  means for determining which pair of adjacent service request ports in a right half portion of a real request port branch is eligible for mapping a real request thereat to a virtual input in said left half portion of said virtual input branch; and
  means operable to effectuate a mapping of a real request from said pair of adjacent service request ports to said virtual input, if necessary; and
 a shuffle controller for controlling said at least one shuffle interface responsive at least in part to a flag status signal received from Level-1 arbiter nodes.

25. The system for arbitrating among N competing entities as set forth in claim 24, wherein said at least one shuffle interface comprises N/4 shuffle interfaces, each of which corresponds to a particular adjacent port pair in said right half portion of said real request port branch.

26. The system for arbitrating among N competing entities as set forth in claim 25, further comprising a shuffle interface pointer for selecting a particular shuffle interface for any arbitration cycle.

27. The system for arbitrating among N competing entities as set forth in claim 26, wherein said shuffle interface pointer comprises a round robin arbiter (RRA) mechanism.

28. An arbitration methodology for arbitrating among N competing entities, each entity operating to generate a service request, said methodology comprising the steps:
 providing a tree structure having (N−1) arbiter nodes organized into K levels, where $N=2^K$ and said levels are designated Level-1 through Level-K, each Level-1 arbiter node operating to select between two competing service requests, and at least one arbiter lode at a higher level, designated as a Level-i node, is operable to select between two competing outputs generated by two lower level arbiter nodes (designated as Level-(i-1) nodes) coupled thereto, said competing service requests and said competing outputs being collectively referred to as competing links, wherein each arbiter node is provided with a direction indicator, said direction indicator for indicating a particular link that said each arbiter node will pick out of a pair of competing links;

determining a probability value associated with said direction indicator based on a set of predetermined factors relating to said pair of competing links;

selecting a competing entity for granting its service request by said Level-K node based on probability values associated with Level-K node's competing links; and resetting, upon each arbitration cycle, said direction indicators associated with said arbiter nodes based on updated probability values; and wherein said probability value associated with said direction indicator is determined based on a composite weighted function having at least a queue age factor relating to each of said pair of competing links.

29. The arbitration methodology for arbitrating among N competing entities as set forth in claim 28, wherein, for each particular link of said pair of competing links coupled to said Level-i node, said queue size factor is derived based on an averaging function of queue age factors corresponding to a sub-tree that supports said each particular link.

30. The arbitration methodology for arbitrating among N competing entities as set forth in claim 29, wherein said averaging function comprises a weighted linear function of said queue age factors.

31. An arbitration methodology for arbitrating among N competing entities, each entity operating to generate a service request, said methodology comprising the steps;

providing a tree structure having (N-1) arbiter nodes organized into K levels, where $N=2^K$ and said levels are designated Level-1 through Level-K, each Level-1 arbiter node operating to select between two competing service requests, and at least one arbiter node at a higher level, designated as a Level-i node, is operable to select between two competing outputs generated by two lower level arbiter nodes (designated as Level-(i-1) nodes) coupled thereto, said competing service requests and said competing outputs being collectively referred to as competing links, wherein each arbiter node is provided with a direction indicator, said direction indicator for indicating a particular link that said each arbiter node will pick out of a pair of competing links;

determining a probability value associated with said direction indicator based on a set of predetermined factors relating to said pair of competing links;

selecting a competing entity for granting its service request by said Level-K node based on probability values associated with Level-K node's competing links;

resetting, upon each arbitration cycle, said direction indicators associated with said arbiter nodes based on updated probability values; and wherein said probability value associated with said direction indicator is determined based on a composite weighted function having at least a service class factor relating to each of said pair of competing links.

32. The arbitration methodology for arbitrating among N competing entities as set forth in claim 31, wherein, for each particular link of said pair of competing links coupled to said Level-i node, said service class factor is derived based on an averaging function of service class factors corresponding to a sub-tree that supports said each particular link.

33. The arbitration methodology for arbitrating among N competing entities as set forth in claim 32, wherein said averaging function comprises a weighted linear function of said service class factors.

* * * * *